(12) United States Patent
Yamakawa et al.

(10) Patent No.: US 6,393,907 B1
(45) Date of Patent: May 28, 2002

(54) THERMO-SENSITIVE FLOW RATE SENSOR

(75) Inventors: Tomoya Yamakawa; Fumiyoshi Yonezawa; Hiroyuki Uramachi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/379,353

(22) Filed: Aug. 23, 1999

(30) Foreign Application Priority Data

Mar. 24, 1999 (JP) .......................................... 11-079431

(51) Int. Cl.[7] .................................................. G01F 1/68
(52) U.S. Cl. .................................................... 73/204.26
(58) Field of Search ........................ 73/204.22, 204.23, 73/204.24, 204.25, 204.26

(56) References Cited

U.S. PATENT DOCUMENTS

| | | | | |
|---|---|---|---|---|
| 4,829,818 A | * | 5/1989 | Bohrer ..................... | 73/204.22 |
| 5,231,878 A | * | 8/1993 | Zanini-Fisher et al. .. | 73/204.26 |
| 5,723,784 A | * | 3/1998 | Lembke et al. .......... | 73/204.26 |
| 5,804,720 A | * | 9/1998 | Morimasa et al. ....... | 73/204.26 |

FOREIGN PATENT DOCUMENTS

| | | |
|---|---|---|
| JP | 62-43522 | 2/1987 |
| JP | 4-2967 | 1/1992 |
| JP | 5-79876 | 3/1993 |
| JP | 9-26343 | 1/1997 |

* cited by examiner

*Primary Examiner*—Benjamin R. Fuller
*Assistant Examiner*—Jewel V. Thompson
(74) *Attorney, Agent, or Firm*—Sughrue Mion, PLLC

(57) ABSTRACT

A thermo-sensitive flow rate sensor that has a flow rate detecting device, in which a heating element constituted by thermo-sensitive resistor film, is formed on a top surface of a plate-like substrate and in which a diaphragm is formed by partially removing the plate-like substrate. This sensor further has a supporting element arranged in such a way as to have a top surface that is parallel to the direction of flow of a fluid to be measured. The flow rate detecting device is supported and fixed in a recess portion formed in the supporting element so that the top surface of the device is nearly flush with the top surface of the supporting element. Further, the thin-plate-like member is attached to the back surface of the flow rate detecting device in such a way as to close a cavity.

34 Claims, 17 Drawing Sheets

THERMO-SENSITIVE FLOW RATE SENSOR

BACKGROUND OF THE INVENTION

1. Field of the Invention

The present invention relates to a flow rate sensor employing a flow rate detecting device which has a heating element and which is used for measuring the flow velocity or flow rate of a fluid according to a heat transfer phenomenon where a heat is transferred from the heating element or from a part heated by the heating element to the fluid. The present invention is applied to, for example, a flow rate sensor for use in measuring an intake air amount of an internal combustion engine.

2. Description of the Related Art

Japanese Unexamined Patent Publication Nos. 62-43522 and 4-2967 disclose known flow rate detecting devices each of which has a diaphragm structure and which is used in a flow rate sensor of such a type.

FIG. 24 is a plan view of a flow rate detecting device for use in a conventional flow rate sensor. FIG. 25 is a sectional view taken in the direction of arrows on line XXV—XXV of FIG. 24.

In the device shown in FIGS. 24 and 25, a plate-like substrate 1 is constituted by a silicon substrate about 0.4 mm thick. A 1-$\mu$m-thick insulative supporting film 2 made of silicon nitride is formed on a surface of the plate-like substrate 1 by performing a method, such as sputtering or CVD. Moreover, a heating element 4 constituted by a thermo-sensitive platinum resistor film is formed on the supporting film 2. This heating element 4 is configured in the following process in such a manner as to form a current path. Namely, a 0.2-$\mu$m-thick thermo-sensitive platinum film is first formed on the surface of the plate-like substrate 1 by using a vapor deposition or sputtering method. Then, patterning is performed on this thermo-sensitive resistor film by employing a photolithographic method and a wet (or dry) etching method. Furthermore, a fluid temperature detecting element 5 similarly constituted by a thermo-sensitive platinum resistor film is formed on the supporting film 2 apart from the heating element 4. This fluid temperature detecting element 5 is constructed in a process similar to the process of forming the heating element 4. First, a 0.2-$\mu$m-thick thermosensitive platinum film is formed on the surface of the plate-like substrate 1 by using a vapor deposition or sputtering method. Subsequently, patterning is performed on this thermo-sensitive resistor film by performing a photolithographic method and a wet (or dry) etching method. Thus, this fluid temperature detecting element 5 is formed in such a way as to form a current path. Moreover, an insulative protective coat 3 is formed on the heating element 4 and the fluid temperature detecting element 5 by producing a 1-$\mu$m-thick film made of silicon nitride through the sputtering or CVD method.

This heating element 4 is connected through connection patterns 9a and 9b and lead patterns 7a and 7d to electrodes 8a and 8d for connecting the flow rate detecting device to an external circuit. Further, the fluid temperature detecting element 5 is connected through lead patterns 7b and 7c to electrodes 8a and 8d for connecting the flow rate detecting device to an external circuit. Electrodes 8a to 8d are electrically connected to an external circuit by a method, such as a wire bonding. Thus, the protective coat 3 is removed from the electrodes 8a to 8d.

Moreover, a cavity 13 is formed under a portion in which the heating element 4 is formed. Thus, a diaphragm 12 for detecting a flow rate is configured. Namely, a back-surface protecting coat 10 is first formed on the back surface (that is, a surface opposite to the surface on which the supporting film 2 is formed) of the plate-like substrate 1. Subsequently, the back-surface protecting coat 10 is partly removed at a place on the back surface side of the region, on which a heating element 4 is formed, by performing a photolithographic method. Thus, an etching hole 11 is formed. Thereafter, a part of the plate-like substrate 1 is removed by performing, for example, alkali etching on the plate-like substrate 1 exposed from the etching hole 11, so that the cavity 13 is formed. Consequently, the diaphragm portion 12 for detecting a flow rate is formed.

A flow rate detecting device 14 configured in this manner is arranged so that the diaphragm 12 for detecting a flow rate is exposed to a flow of a fluid to be measured. Incidentally, in these figures, arrows 6 indicate the direction of flow of the fluid to be measured.

Meanwhile, the flow rate detecting device 14 is shaped like a plate, as described above. In the case where the diaphragm 12 is placed in such a manner as to face the direction of flow of the fluid to be measured, a wind pressure is applied to the diaphragm 12, so that a failure of the diaphragm 12 is caused at a high flow rate. Further, dust contained in the fluid to be measured deposits on a diaphragm portion, with the result that drift in the flow rate detecting characteristics occurs. In such cases, the plate-like flow rate detecting device 14 is placed almost parallel to or at a predetermined angle with respect to the direction of flow of the fluid to be measured.

Furthermore, in the case that the plate-like flow rate detecting device 14 is placed almost parallel to or at a predetermined angle with respect to the direction of flow of the fluid to be measured, disturbance in flow of the fluid to be measured occurs in the vicinity of the cavity 13. Moreover, unevenness in the shape of the front edge portion of the flow rate detecting device 14, which is caused due to the chipping thereof, results in variation in flow of the fluid to be measured. This variation in the flow of the fluid to be measured, which is caused in the vicinity of the heating element 4, leads to reduction in accuracy of the flow rate detecting characteristics.

Thus, there has been previously proposed a flow rate sensor in which the flow-rate detecting device 14 is placed in a recess portion 18 provided in a plate-like supporting element 16, as illustrated in FIG. 26, to thereby prevent disturbance in flow of the to-be-measured fluid from occurring in the vicinity of the cavity 13, and in which the upstream-side end portion of the supporting element 16 is formed in an arcuated shape, thereby straightening the flow of the to-be-measured fluid and reducing variation in flow of the to-be-measured fluid, which would occur owing to unevenness in the shape of the front edge portion of the flow rate detecting device 14.

FIG. 26 is a perspective view of a primary part of the conventional flow rate detecting device.

In the device of FIG. 26, the supporting element 16 is shaped like a plate and attached to a base member 20. Further, the recess portion 18, whose perimeter is a little longer than that of the flow rate detecting element 14, is provided in a surface portion of the supporting element 16. The flow rate detecting device 14 is disposed in the recess portion 18 so that the top surface of the flow rate detecting device 14 is almost flush with the top surface of the supporting element 16. Moreover, the electrodes 8a to 8d of the flow rate detecting device 14 are electrically connected to leads 17, which are disposed in the base member 20, through wires 19. Furthermore, a cover 21 is attached to the base member 20, so that the electrodes 8a to 8d and the wires 19 are protected by the cover 21.

In the case that the fluid to be measured flows only on the surface of the flow rate detecting device 14 in a low flow rate range. However, in a high flow rate range, movement of the fluid to be measured occurs between the recess portion 18 provided in the supporting element 16 and the flow rate detecting device 14. Namely, as illustrated in FIGS. 27 and 28, a flow 22 of the to-be-measured fluid flowing on the surface of the flow rate detecting device 14 and a flow 23 thereof flowing between the recess portion 18 and the flow rate detecting device 14 are generated in the high flow rate range. Further, the flow 23 of the to-be-measured fluid is unstable, as compared with the flow 22 thereof. Thus, the accuracy in detecting a flow rate is deteriorated in the high flow rate range. Consequently, the conventional flow rate detecting device 14 has a drawback in that a flow rate measuring range is limited.

Then, to eliminate such a drawback, there has been devised a measure to completely closely stick or bond the back surface of the flow rate detecting device 14 to the recess portion 18 provided in the supporting element 16, thereby surely eliminating the aforementioned unstable flow 23 of the fluid to be measured However, according to this measure, the cavity 13 is hermetically sealed. Thus, this measure has a drawback in that, when variation in pressure occurs in a flow path of the fluid, the deformation and breakage of the diaphragm 12 are caused owing to the difference between an internal pressure of the cavity 13 and an external pressure.

Moreover, when a flow rate sensor is manufactured, the step of bonding and fixing the flow rate detecting device 14 to the recess portion 18 provided in the supporting element 16 is a precise operation to be performed by preventing an adhesive, which has intruded into the cavity 13, from adhering to the diaphragm 12. Thus, this measure has another drawback in that the cost of manufacturing the flow rate sensor increases.

Furthermore, this measure facilitates the transmission of heat generated by the heating element 4 to the supporting element 16 through the plate-like substrate 1. Thus, this measure has still another drawback in that the flow rate detecting sensitivity of the sensor is degraded.

Further, to eliminate the aforementioned drawbacks, there has been proposed a supporting structure as disclosed in, for example, the Japanese Unexamined Patent Publication No. 9-26343.

In the supporting structure described in the Japanese Unexamined Patent Publication No. 9-26343, a recess portion 51 for accommodating the flow rate detecting device 14 in a surface portion thereof is provided in a sensor supporting element 50, as shown in FIG. 29. Moreover, a groove-like slot 52 is provided in the bottom part of the recess portion 51 in such a manner as to extend along the periphery of the flow rate detecting device 14. This slot 52 is provided in such a way as to extend outside a sensor area (namely, a flow rate detecting diaphragm area 13).

Further, the flow rate detecting device 14 is placed in the recess portion 51 so that the top surface of the device 14 is substantially flush with the sensor supporting element 50. Moreover, the flow rate detecting device 14 is fixed to the bottom surface of the recess portion 51 outside the diaphragm region 13 by an adhesive 53.

In this supporting structure, the to-be-measured fluid flows into the recess portion 51 from between the front edge surface (namely, the upstream edge surface) of the flow rate detecting device 14 and the upstream inner surface of the recess portion 51, as viewed in the direction of flow of the fluid. Subsequently, this fluid runs through the slot 52. Then, this fluid streams out from between the rear edge surface (namely, the downstream edge surface) of the flow rate detecting device 14 and the downstream inner surface of the recess portion 51, as viewed in the direction of flow of the fluid.

Thus, the unstable flow of the to-be-measured fluid flowing between the bottom portion of the recess portion 51 and the back surface of the flow rate detecting device 14 is reduced. Consequently, the deterioration in accuracy of flow rate detection in the high flow rate range is suppressed.

The supporting structure described in the Japanese Unexamined Patent Publication No. 9-26343 is constructed as described above. Therefore, the to-be-measured fluid led to the slot 52 sometimes goes round to a gap between the bottom part of the recess portion 51 and the cavity 13. Consequently, the fluid to be measured is not sufficiently prevented from flowing between the bottom part of the recess portion 51 and the back surface of the flow rate detecting device 14.

Further, the back surface of the flow rate detecting device 14 is placed close to the bottom part of the recess portion 51 except the part corresponding to the slot 52. Thus, most of heat generated by the heating element 4 is transmitted to the sensor supporting element 50. Consequently, the sensor employing this supporting structure has a drawback in that the flow rate detecting sensitivity of the sensor is deteriorated.

Additionally, in the case of forming a fluid temperature detecting device on the flow rate detecting device 14 by being combined therewith, the heat insulation between the flow rate detecting device 14 and the sensor supporting element 50 is insufficient because the flow rate detecting device 14 is placed close to the bottom part of the recess portion 51. Thus, the sensor employing this supporting structure has a drawback in that the detection response delay of the fluid temperature detecting device occurs.

SUMMARY OF THE INVENTION

The present invention is accomplished to eliminate the aforementioned drawbacks of the conventional sensor.

Accordingly, an object of the present invention is to provide a flow rate sensor with high flow rate measuring accuracy and good sensitivity.

To achieve the foregoing object, according to an aspect of the present invention, there is provided a thermo-sensitive flow rate sensor that comprises: a flow rate detecting device having a plate-like substrate, a heating element made of thermo-sensitive resistor film and formed on a surface of the plate-like substrate, and a cavity formed by removing a part of the plate-like substrate provided under the heating element to constitute a diaphragm for detecting a flow rate; and a supporting element having a recess portion for accommodating the flow rate detecting device formed on a top surface thereof, the supporting element being arranged so that the top surface thereof is in parallel with or at a predetermined angle with respect to a direction of flow of a fluid to be measured. In this thermo-sensitive flow rate sensor, a supporting face for supporting the flow rate detecting device is formed in the recess portion. Further, the flow rate detecting device is accommodated in the recess portion and is supported with and fixed to the supporting face so that the top surface of the flow-rate detecting device is nearly flush with the top surface of the supporting element. Moreover, a thin-plate-like member is attached to a back surface of the plate-like substrate of the flow rate detecting device in such a way as to close the cavity.

Further, according to another aspect of the present invention, there is provided a thermo-sensitive flow rate sensor that comprises: a flow rate detecting device having a plate-like substrate, a heating element made of thermo-sensitive resistor film and formed on a surface of the plate-like substrate, and a cavity formed by removing a part of the plate-like substrate provided under the heating element to constitute a diaphragm for detecting a flow rate; and a supporting element having a recess portion for accommodating the flow rate detecting device formed on a top surface thereof, the supporting element being arranged so that the top surface thereof is in parallel with or at a predetermined angle with respect to a direction of flow of a fluid to be measured. In this thermo-sensitive flow rate sensor, a plurality of first faces for supporting the flow rate detecting device are provided apart from one another in the recess portion, a second face facing a peripheral portion of the cavity and having a width being wider than that of the flow rate detecting device in the direction of flow of fluid to be measured is provided in the recess portion, and a third face, which does not face the cavity, is provided in the recess portion. Further, the second face is provided at a place that is deeper in a direction of depth of the recess portion than the plurality of first faces and the third face is provided at a place that is deeper in the direction of depth of the recess portion than the second face. Moreover, the flow rate detecting device is accommodated in the recess portion, is supported with the plurality of first faces and is fixed to at least one of the first faces so that the top surface of the flow rate detecting device is nearly flush with the top surface of the supporting element.

Moreover, according to still another aspect of the present invention, there is provided a thermo-sensitive flow rate sensor that comprises: a flow rate detecting device having a plate-like substrate, a heating element made of thermo-sensitive resistor film and formed on a surface of the plate-like substrate, and a cavity formed by removing a part of the plate-like substrate provided under the heating element to constitute a diaphragm for detecting a flow rate; and a supporting element having a recess portion for accommodating the flow rate detecting device formed on a top surface thereof, the supporting element being arranged so that the top surface thereof is in parallel with or at a predetermined angle with respect to a direction of flow of a fluid to be measured. In this thermo-sensitive flow rate sensor, a plurality of first faces for supporting the flow rate detecting device are provided apart from one another in the recess portion, a second face facing a peripheral portion of the cavity and having a width being wider than that of the flow rate detecting device in the direction of flow of fluid to be measured is provided in the recess portion, and a fourth face facing at least a part of the cavity is provided in the recess portion. Further, the second face is provided at a place that is deeper in a direction of depth of the recess portion than the plurality of first faces and the fourth face is provided at a place that is deeper in the direction of depth of the recess portion than the second face. Moreover, the flow rate detecting device is accommodated in the recess portion, is supported with the plurality of first faces and is fixed to at least one of the first faces so that the top surface of the flow rate detecting device is nearly flush with the top surface of the supporting element.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

First Embodiment

Figure 1:
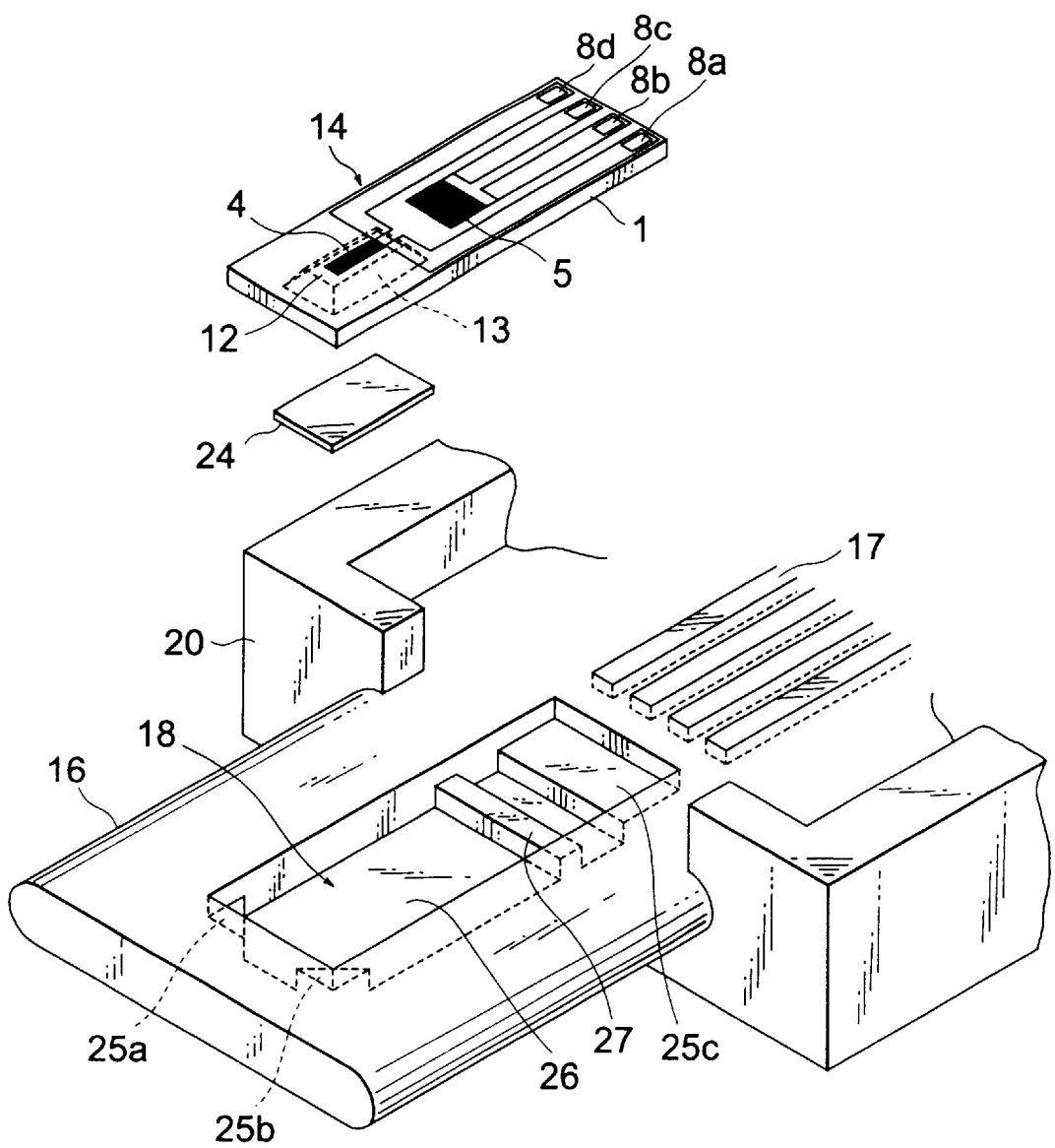
FIG. 1 is an exploded perspective view illustrating a supporting structure for supporting a flow rate detecting device provided in a flow rate sensor according to a first embodiment of the present invention.
Figure 2:
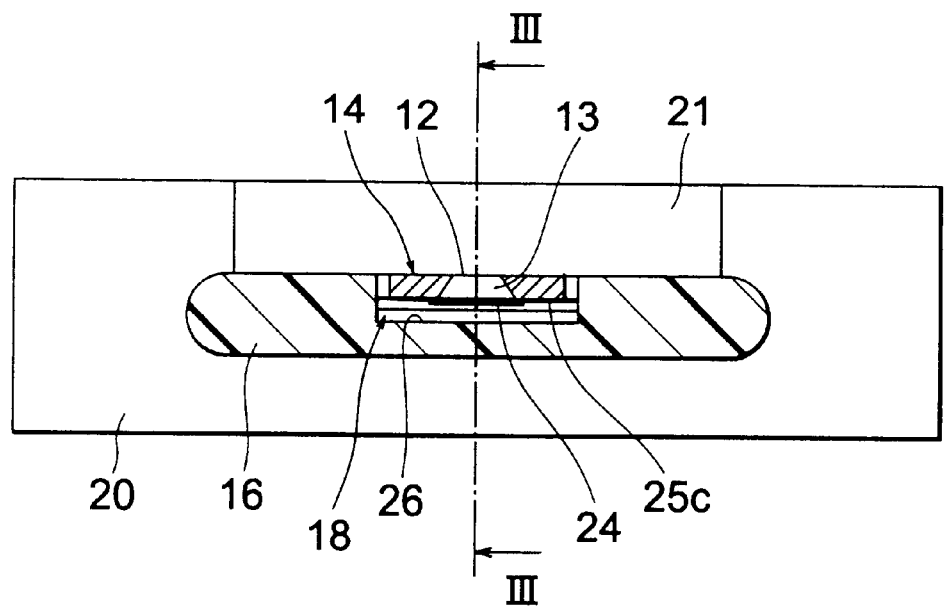
FIG. 2 is a sectional view of a primary portion of a supporting structure for supporting the flow rate detecting device provided in the flow rate sensor according to the first embodiment of the present invention.
Figure 3:
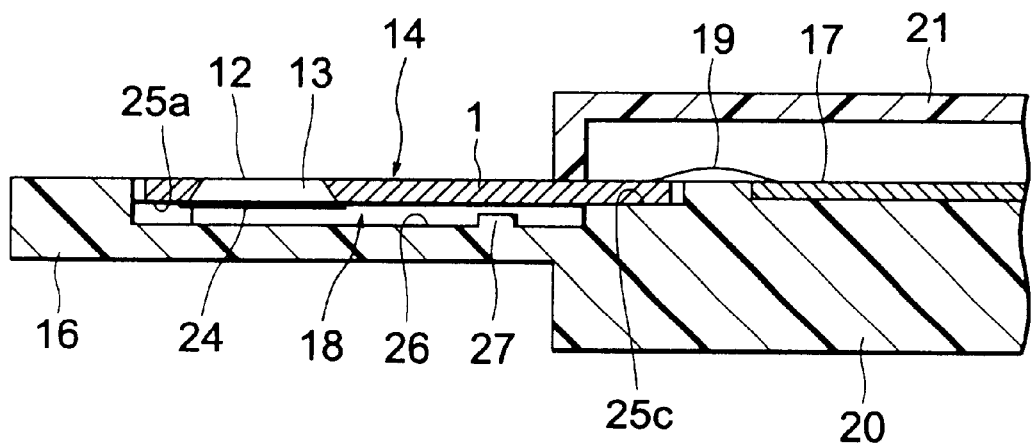
FIG. 3 is a sectional view taken in the direction of arrows on line III—III of FIG. 2.

FIG. 1 is an exploded perspective view illustrating a supporting structure for supporting a flow rate detecting device provided in a flow rate sensor according to the first embodiment of the present invention. FIG. 2 is a sectional view of a primary portion of a supporting structure for supporting the flow rate detecting device provided in the flow rate sensor according to the first embodiment of the present invention. FIG. 3 is a sectional view taken in the direction of arrows on line III—III of FIG. 2. In each of these figures, like reference characters designate like or corresponding parts of the conventional flow rate sensor illustrated in FIGS. 24 to 29. Further, the description of such parts is omitted herein. Incidentally, in FIG. 1, the illustration of a cover 21 is omitted.

As shown in FIGS. 1 to 3, a thin-plate-like member 24 is attached to the back surface of the plate-like substrate 1 of a flow rate detecting device 14 in such a way as to cover a cavity 13. A supporting element 16 is made of resin and shaped like a plate and fitted to a base member 20. Further, a recess portion 18, whose perimeter is a little longer than that of the flow rate detecting element 14, is provided in the surface portion of the supporting element 16.

First faces 25a, 25b and 25c are provided on this recess portion 18. All of the first faces 25a, 25b and 25c are nearly on the same plane. Further, the recess portion 18 has a bottom surface 26 that is deeper than the first faces 25a, 25b and 25c. Furthermore, a ridge portion 27 is provided on the bottom surface 26 of the recess portion 18 in a protruding manner in the vicinity of the first face 15c. This ridge portion 27 is positioned at a place that is deeper than the first faces 25a, 25b and 25c.

Moreover, the flow rate detecting device 14 is accommodated in the recess portion 18 and is fixed to the first face 25c by an adhesive. At that time, the top surface of the flow rate detecting device 14 is nearly flush with the top surface of the supporting element 16. Further, there is a space between the bottom surface 26 of the recess portion 18 and the flow rate detecting device 14. Additionally, the ridge portion 27 prevents the adhesive from flowing into a sensor region.

Incidentally, the thin-plate-like member 24 is formed from a thin metal, glass or polyimide resin. Further, the thickness and material of this thin-plate-like member 24 are selected in such a manner as to be more flexible than a diaphragm 12. This thin-plate-like member 24 is bonded to the back surface of the substrate 1 of the flow rate detecting device 14 by an epoxy-based or silicone-based adhesive. Needless to say, pressure-sensitive adhesive sheet or tape, onto one side of which such an adhesive is applied as a pressure sensitive material, may be used as the thin-plate-like member 24. Moreover, in the case that the thin-plate-like member 24 is made of a glass-based material, anodic bonding may be used for bonding the thin-plate-like member 24 to the plate-like substrate 1.

Figure 4:
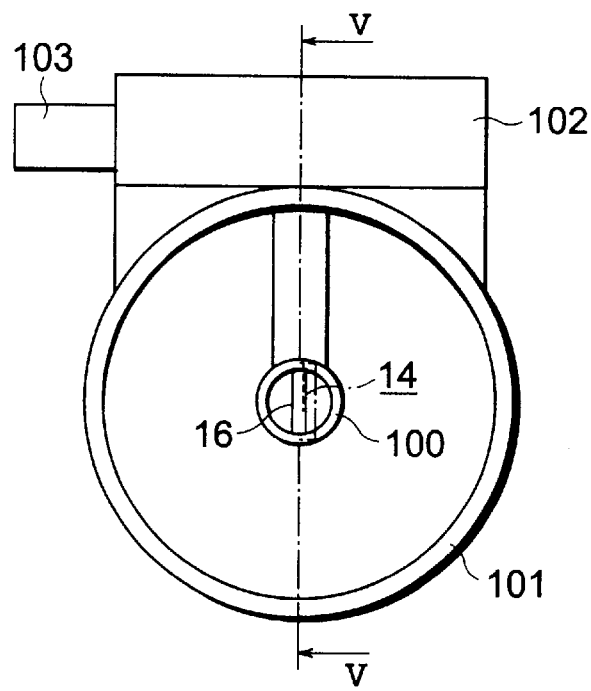
FIG. 4 is a front view of the flow rate sensor according to the first embodiment of the present invention.
Figure 5:
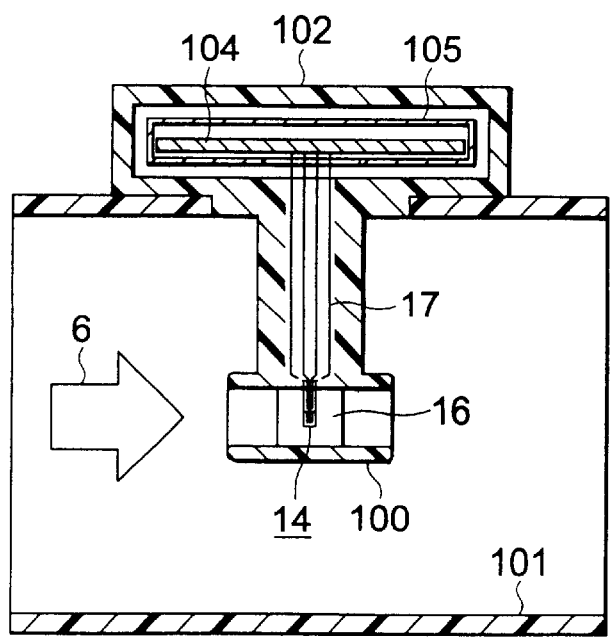
FIG. 5 is a sectional view taken in the direction of arrows on line V—V of FIG. 4.

FIG. 4 is a front view of the flow rate sensor according to the first embodiment of the present invention. FIG. 5 is a sectional view taken in the direction of arrows on line V—V of FIG. 4.

In this flow rate sensor illustrated in FIGS. 4 and 5, a cylindrical main passage 101 serving as a passage for a fluid to be measured is coaxially disposed in a cylindrical detecting pipe 100. The flow rate detecting device 14 supported by the supporting element 16 is disposed in the main passage 101 so that a top surface thereof is in parallel with (or at a predetermined angle with respect to) the direction 6 of flow of the to-be-measured fluid. Further, a case 102 is provided on a peripheral portion of the detecting pipe 100. A detecting circuit board 104 is accommodated in this case 102. This detecting circuit board 104 is electrically connected to the flow rate detecting device 14 through leads 17. Moreover, a connector 103 for supplying electrical power to the flow rate sensor and taking an output of this sensor is attached to the case 102. A shielding member 105 for protecting the detecting circuit board 104 from external disturbance noises, such as electromagnetic waves, is provided in the case 102 in such a way as to cover the detecting circuit board 104.

Incidentally, the configuration of each of flow rate sensors of the other embodiments (to be described later) of the present invention is the same with that of the flow rate sensor illustrated in FIGS. 4 and 5.

Figure 6:
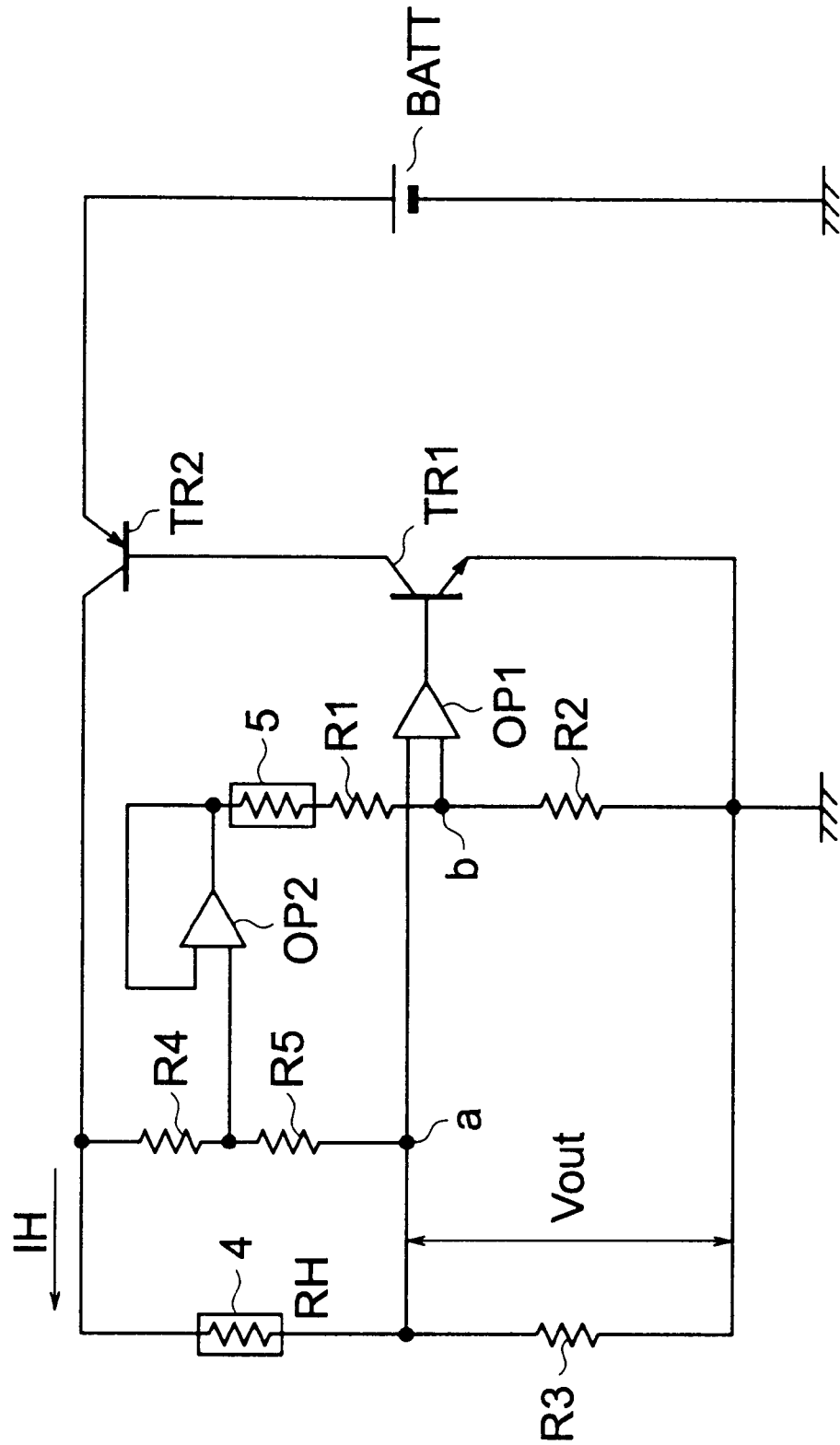
FIG. 6 is a diagram showing a detecting circuit provided in the flow rate sensor according to the first embodiment of the present invention.

In this flow rate sensor, a heating element 4 is controlled by the detecting circuit illustrated in FIG. 6 in such a manner as to have a resistance value by which the average temperature of the heating element 4 is caused to have a predetermined value. The detecting circuit is constituted by a bridge circuit including a fluid temperature detecting element 5 and the heating element 4. In this figure, reference characters R1, R2, R3, R4 and R5 denote fixed resistors. Reference characters OP1 and OP2 designate operational amplifiers. Reference characters TR1 and TR2 represent transistors, and BATT denotes a power supply. Further, the composing elements of the detecting circuit except the fluid temperature detecting element 5 and the heating element 4 are constructed on the detecting circuit board 104.

This detecting circuit acts so that the electric potential at nodes "a" and "b" shown in this figure are nearly equal to each other. Further, this detecting circuit controls a heating current IH for the heating element 4. When the flow velocity of the fluid to be measured increases, an amount of heat transferred to the to-be-measured fluid from the heating element 4 increases. A signal corresponding to the flow velocity or a signal corresponding to the flow rate of the fluid flowing through a passage having a predetermined sectional area is obtained by detecting this heating current in the form of a voltage Vout developed across the resistor R3.

In the flow rate sensor configured in this manner, the to-be-measured fluid flows into the recess portion 18 from between the front edge surface of the flow rate detecting device 14 and the upstream inner surface of the recess portion 18, as viewed in the direction of flow of the fluid. Subsequently, this fluid runs through between the bottom portion 26 and the back surface of the flow rate detecting device 14. Then, this fluid streams out from between the rear edge surface of the flow rate detecting device 14 and the upstream inner surface of the recess portion 18, as viewed in the direction of flow of the fluid. At that time, a flow rate detecting cavity 13 is closed by the thin-plate-like member 24. Thus, the movement of unstable fluid does not occur in the cavity 13. Consequently, the accuracy of detecting a flow rate is enhanced.

Furthermore, the thin-plate-like member 24 is made of a flexible material. Thus, even when the difference between the internal pressure of the cavity 13 and the external pressure is caused owing to variation in pressure of the atmosphere, deformation of the thin-plate-like member 24 prevents deformation and breakage of the diaphragm 12.

The larger the proportion of an amount of heat lost by the movement of the to-be-measured fluid to the entire Joule heat generated in the heating element 4, the higher the sensitivity of the flow rate sensor. In other words, the smaller the amount of heat transmitted to the supporting element 16 through the cavity 13, the higher the sensitivity of the flow rate sensor. This flow rate sensor assures a sufficient space between the flow rate detecting device 14 and the bottom surface 26 of the supporting element 16. Therefore, heat transmitted from the heating element 4 to the plate-like substrate 1 is difficult to be transmitted to the supporting element 16. Consequently, the sensitivity of detecting a flow rate is enhanced.

Furthermore, in the case of employing a metallic material as the material of the thin-plate-like member 24, such a member 24 has high heat resistance. Thus, the member 24 is neither deformed nor deteriorated owing to heat generated by the heating element 4.

Moreover, in the case of employing a glass-based material as the material of the thin-plate-like member 24, such a member 24 has high heat resistance and low heat conductivity. Thus, an amount of heat transmitted from the heating element 4 to the supporting element 16 is decreased. Consequently, the sensitivity of the sensor is enhanced. Further, in the case that the plate-like substrate 1 made of silicone is anodic-bonded to the thinplate-like member 24 made of a glass-based material, the bonding is achieved with high adhesion and reliability.

Additionally, in the case of employing a polyimide-based material as the material of the thin-plate-like member 24, such a member 24 has high heat resistance. Moreover, the flexibility of the member 24 is enhanced still more. In this case, such a member 24 can be applied to a high responsivity flow rate sensor having thinner supporting film 2 and thinner protective coat 3.

Further, in the case of using an epoxy-based adhesive as the adhesive to be used for bonding between the thin-plate-like member 24 and the plate-like substrate 1, high heat resistance bonding is realized therebetween. In the case of employing a silicone-based adhesive as the adhesive to be used for bonding therebetween, the bonding therebetween is achieved with high heat resistance and hermeticity.

Additionally, if the thin-plate-like member 24 is preliminarily attached to the flow rate detecting device 14, when the flow rate detecting device 14 is bonded and fixed to the supporting element 16, the adhesive is prevented from going round to the cavity 13 and from adhering to the diaphragm 12 to the worst case, thereby preventing from deteriorating the flow rate detecting performance of the sensor.

Second Embodiment

Figure 7:
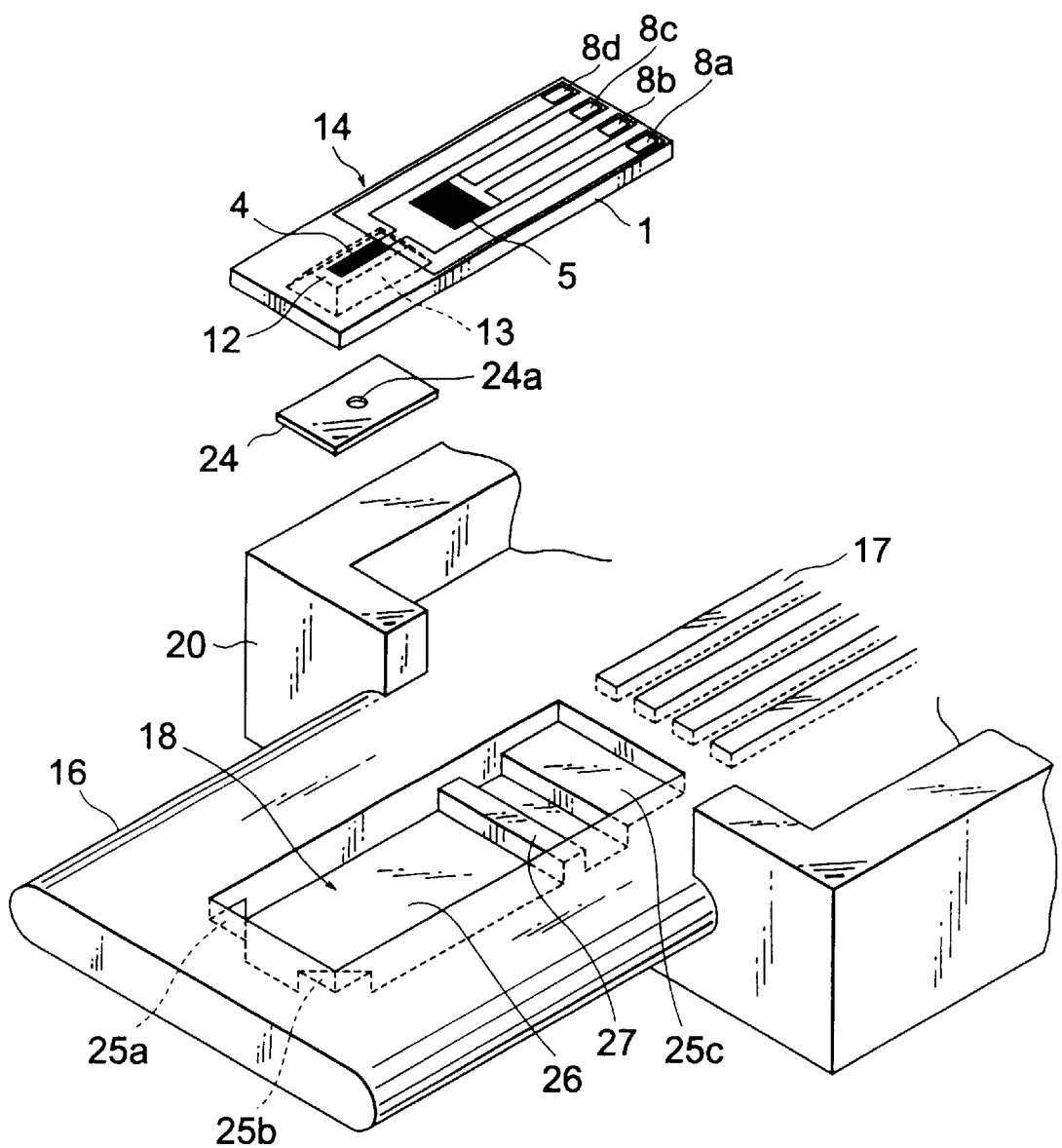
FIG. 7 is an exploded perspective view of the periphery of a supporting structure for supporting a flow rate detecting device provided in a flow rate sensor according to a second embodiment of the present invention.

FIG. 7 is an exploded perspective view of the periphery of a supporting structure for supporting a flow rate detecting device provided in a flow rate sensor according to the second embodiment of the present invention.

In this second embodiment, a cavity 13 is closed by a thin-plate-like member 24 in which a small hole 24a is opened. Incidentally, the other composing elements of the second embodiment are the same as of the aforementioned first embodiment.

In the flow rate sensor constructed in this way, even when the pressure of the ambient atmosphere varies, the pressure in the cavity 13 is balanced with the pressure of the atmosphere by means of the hole 24a communicating the atmosphere with the cavity 13, so that a diaphragm 12 is not damaged. Therefore, this embodiment is applicable to a flow rate sensor whose thin-plate-like member 24 does not have sufficient flexibility.

Further, the hole 24a is a small hole bored in the thin-plate-like member 24 and is constructed so that the area of the hole 24a is smaller than the area of the cavity portion. Moreover, the hole 24a is opened in a direction perpendicular to the surface of the thin-plate-like member 24. Thus, the fluid to be measured flowing through the gap between the bottom portion 26 of the recess portion 18 and the back surface of the flow rate detecting device 14 is difficult to flow into the cavity 13. Namely, the hole 24a has a small diameter. Thus, the pressure loss of the device is large. Furthermore, the direction of the hole 24a is perpendicular to the flow of the fluid to be measured. Thus, the fluid to be measured should change the direction of flow thereof into a direction perpendicular thereto so as to flow into the cavity 13 from the hole 24a. Consequently, the fluid to be measured is difficult to flow into the cavity 13. Therefore, the movement of the to-be-measured fluid flowing through the gap between the back surface of the flow rate detecting device 14 and the bottom surface 26 of the recess portion 18 does not affect the surface of the diaphragm 12 provided on the side of the cavity 13. Hence, the accuracy of measuring a flow rate is enhanced.

Third Embodiment

Figure 8:
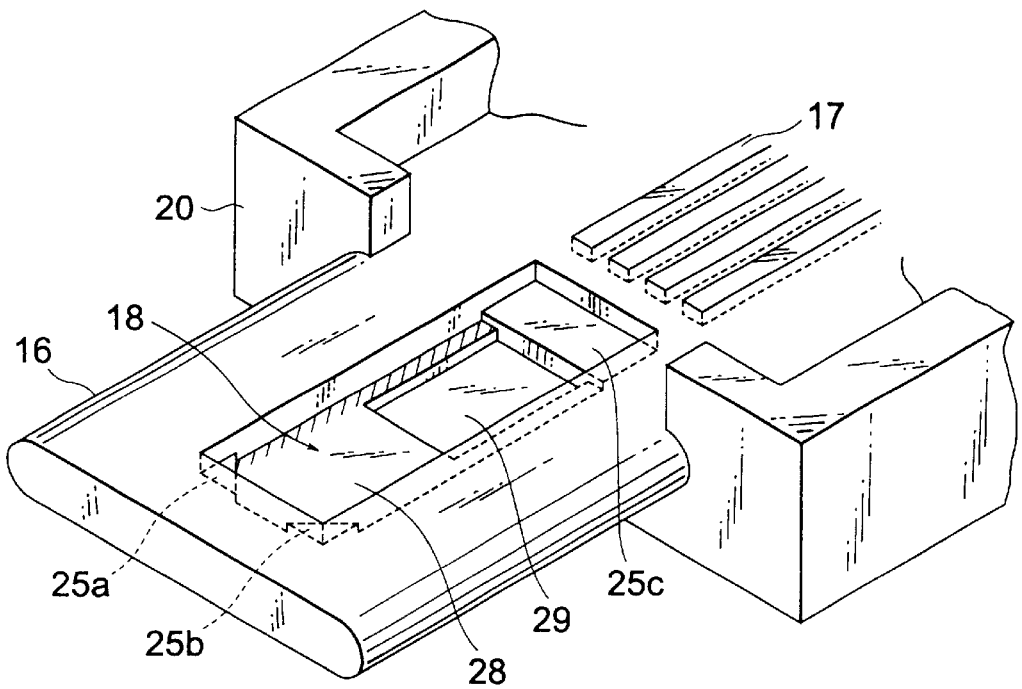
FIG. 8 is an exploded perspective view illustrating a supporting element provided in a flow rate sensor according to a third embodiment of the present invention.
Figure 9:
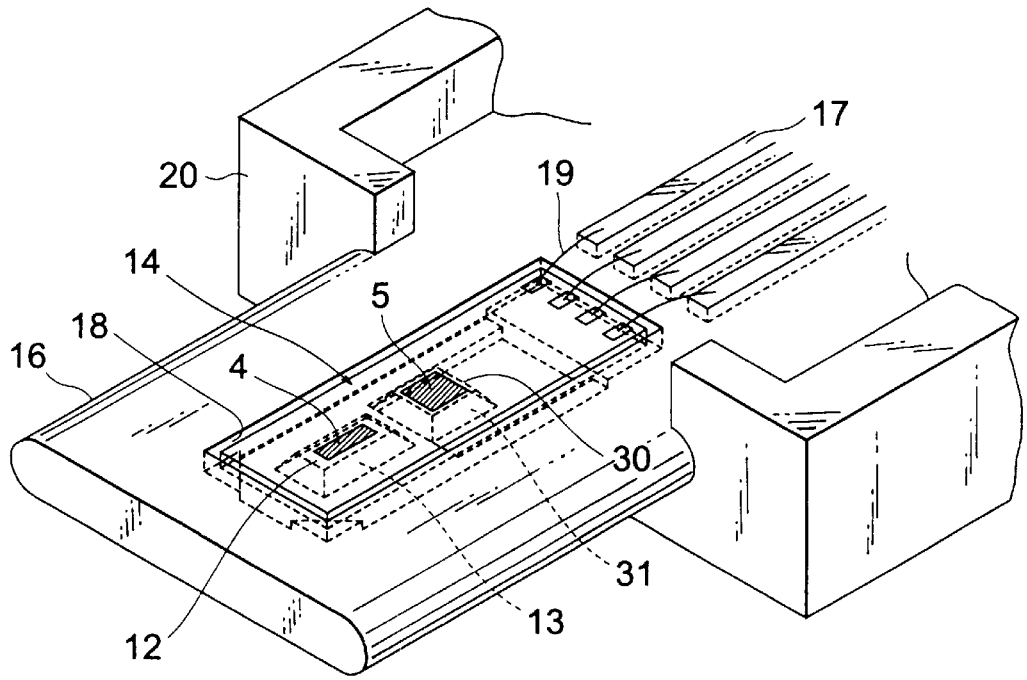
FIG. 9 is a perspective view illustrating a state in which a flow rate detecting device is supported in the flow rate sensor according to the third embodiment of the present invention.
Figure 10:
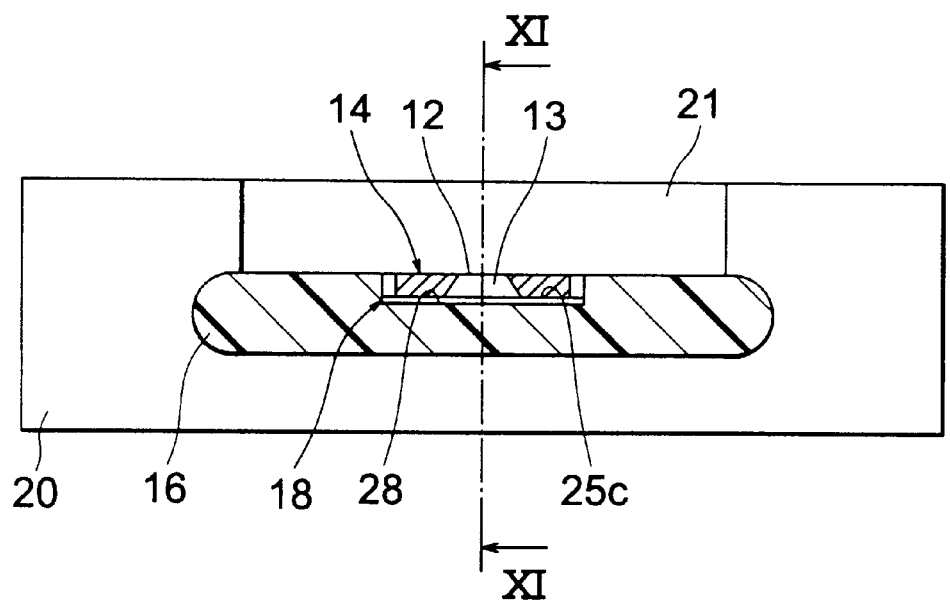
FIG. 10 is a sectional view of a primary portion of the supporting structure for supporting the flow rate detecting device provided in the flow rate sensor according to the third embodiment of the present invention.
Figure 11:
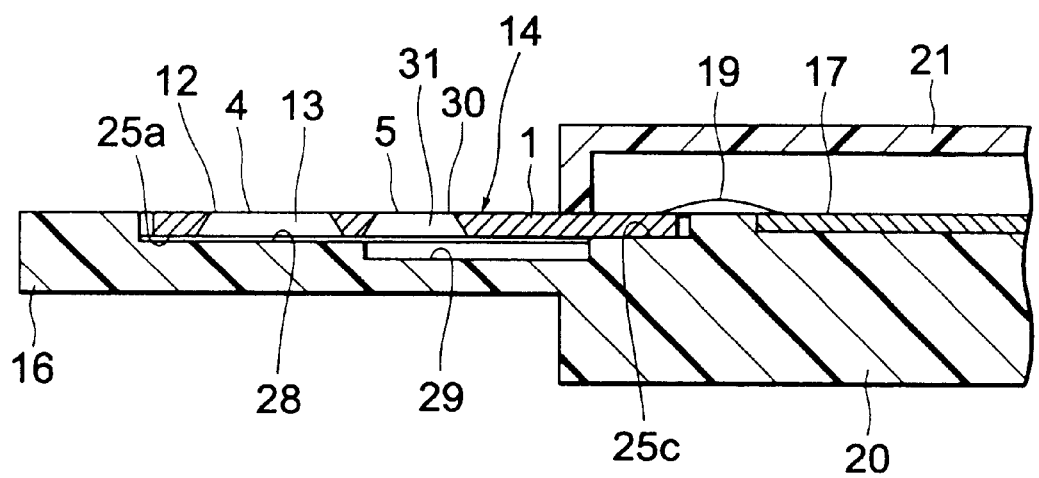
FIG. 11 is a sectional view taken in the direction of arrows on line XI—XI of FIG. 10.

FIG. 8 is an exploded perspective view illustrating a supporting element provided in a flow rate sensor according to the third embodiment of the present invention. FIG. 9 is a perspective view illustrating a state in which a flow rate detecting device is supported in the flow rate sensor according to the third embodiment of the present invention. FIG. 10 is a sectional view of a primary portion of the supporting structure for supporting the flow rate detecting device provided in the flow rate sensor according to the third embodiment of the present invention. FIG. 11 is a sectional view taken in the direction of arrows on line XI—XI of FIG. 10. Incidentally, in FIGS. 8 and 9, the illustration of the cover 21 is omitted.

As shown in FIGS. 8 to 11, a flow rate detecting device 14 has a fluid temperature detecting diaphragm 30 formed by removing a lower portion of a fluid temperature detecting element 5 of the plate-like substrate 1, in addition to a flow rate detecting diaphragm 12.

The supporting element 16 is made of resin and shaped like a plate and attached to a base member 20. Further, a recess portion 18, whose perimeter is a little longer than that of the flow rate detecting element 14, is provided in a surface portion of the supporting element 16.

In this recess portion 18, first faces 25a, 25b and 25c, which are spaced from one another and used for supporting the flow rate detecting device 14, are provided. These first faces 25a, 25b and 25c are provided substantially on the same plane. Furthermore, the recess portion 18 has a second face 28 provided at a place that is deeper than the first faces 25a, 25b and 25c. Moreover, the recess portion 18 has a third face 29 provided at a place that is deeper than the second face 28. Further, the third face 29 is formed so that the face 29 faces a cavity 31 of the fluid temperature detecting diaphragm 30 and the peripheral portion of the cavity 31, and that the width thereof in the direction of flow of the to-be-measured fluid is narrower than the width of the flow rate detecting device 14. Furthermore, the second face 28 is formed on the entire bottom surface of the recess portion 18 except the first faces 25a, 25b and 25c and the third face 29. Thus, the second face 28 faces the cavity 13 of the flow rate detecting diaphragm 12 and the peripheral portion of the cavity 13. The third face 29 faces the cavity 31 of the fluid temperature detecting diaphragm 30 and the peripheral portion of the cavity 31.

Incidentally, the second face 28 and the first faces 25a, 25b and 25c are regulated so that the difference in position in the direction of depth between the second face 28 and each of the first faces 25a, 25b and 25c is not more than 50 $\mu$m.

Further, the flow rate detecting device 14 is supported by the first faces 25a, 25b and 25c and accommodated in the recess portion 18 and fixed to the first face 25c by an adhesive. At that time, the top surface of the flow rate detecting device 14 is almost flush with that of the supporting element 16. Furthermore, the second face 28 is provided close to the back surface of the plate-like substrate 1 of the flow rate detecting device 14. Conversely, the third face 29 is provided apart from the back surface of the plate-like substrate 1 of the flow rate detecting device 14.

Figure 27:
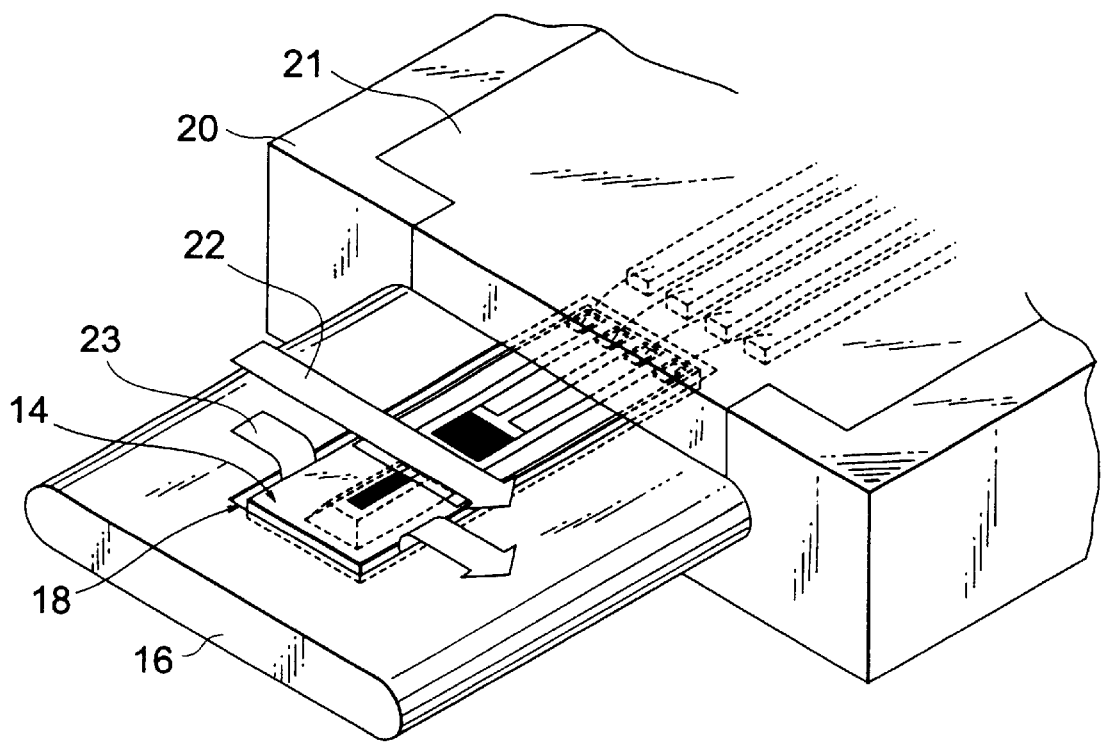
FIG. 27 is a perspective view illustrating flow of a to-be-measured fluid in a high flow rate range in the conventional thermo-sensitive flow rate sensor.
Figure 28:
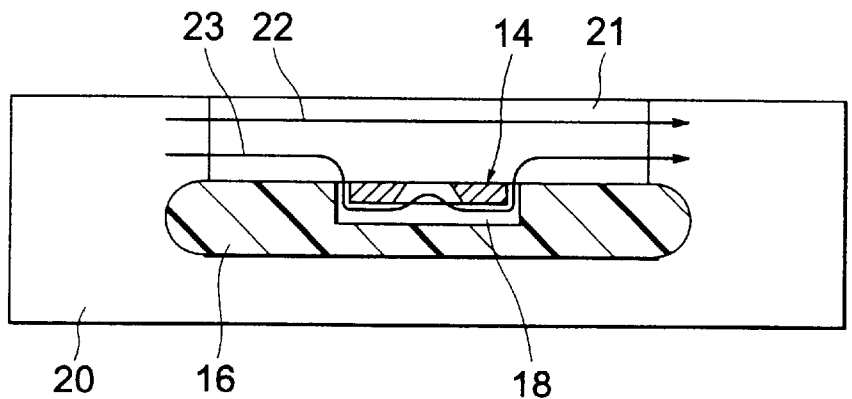
FIG. 28 is a sectional view illustrating flow of a to-be-measured fluid in a high flow rate range in the conventional thermo-sensitive flow rate sensor.
Figure 29:
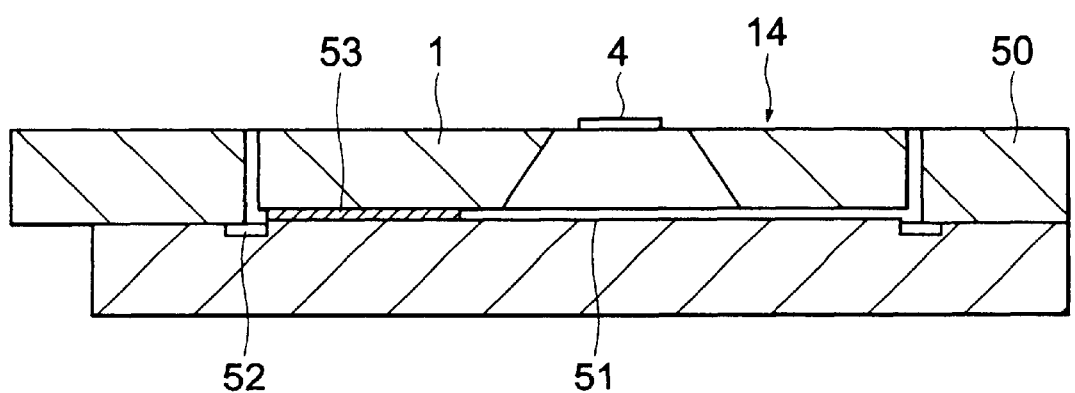
FIG. 29 is a perspective view of a primary portion of another conventional supporting structure for supporting a flow rate detecting device.

In the flow rate sensor configured in this manner, the second face 28 is close to the back surface of the plate-like substrate 1. Moreover, in the proximity of the cavity 13 of the flow rate detecting diaphragm, the second face 28 extends across the recess portion's width in the direction of flow of the fluid to be measured. Furthermore, as indicated by diagonally shaded areas in FIG. 8 and viewed in the direction of flow of the to-be-measured fluid, the front edge portion of the second face 28 is formed over the width of the entire bottom part of the recess portion 18 in the direction which is at a right angle to the direction of flow of the to-be-measured fluid. Thus, the fluid to be measured flows into the recess portion 18 from the space between the front edge portion of the flow rate detecting device 14 and the inner surface of the recess portion 18. Then, the movement path of the to-be-measured fluid to be caused to flow into the space between the second face 28 and the back surface of the flow rate detecting device 14 is narrowed over the entire upstream area of the flow rate detecting device 14. Consequently, the fluid is difficult to flow into the space between the second face 28 and the back surface of the flow rate detecting device 14. Namely, it is difficult to introduce the to-be-measured fluid into the cavity 13. Thus, the flow 23 of the to-be-measured fluid illustrated in FIG. 27 is considerably reduced, so that unstable flow is hard to occur in the cavity 13. Consequently, the accuracy of detecting a flow rate is enhanced to a sufficiently high level.

Further, the difference in position in the direction of depth between the second face 28 and each of the first faces 25a, 25b and 25c should be small so as to prevent the to-be-measured fluid from intruding into the cavity 13. Even in the cases that the supporting element 16 is resin molded, and that the supporting element is made of a metallic material and is press-molded, such a minute distance therebetween is realized with high accuracy by integrally forming the first faces 25a, 25b and 25c and the second face 28 by means of a molding die. When the difference in position in the direction of depth between the second face 28 and each of the first faces 25a, 25b and 25c is not more than 50 $\mu$m, narrowing (namely, throttling) effects are obtained. Further, when such a difference therebetween is not more than several $\mu$m, the fluid to be measured is more reliably prevented from intruding into the space between the second face 28 and the back surface of the flow rate detecting device 14.

Heat generated by the heating element 4 is transmitted to the fluid to be measured. Further, such heat is also transmitted to the plate-like substrate 1 through the flow rate detecting diaphragm 12. Thus, the temperature of the plate-like substrate 1 is a little higher than that of the fluid to be measured. If most of heat is transmitted from the substrate 1 to the supporting element 16, the flow rate detecting sensitivity is degraded. In the third embodiment, the third face 29 is provided apart from the back surface of the flow rate detecting device 14. Therefore, heat transmitted from the heating element 4 to the plate-like substrate 1 is difficult to escape to the supporting element 16. Consequently, in the heat generated by the heating element 4, the flow of heat other than the heat transmitted to the fluid to be measured is reduced. Hence, the sensitivity of the flow sensor is enhanced.

Additionally, the third face 29 has a width in the direction of flow of the fluid to be measured, which is narrower than the width of the flow rate detecting device 14. Further, the third face 29 is provided inside the flow rate detecting device 14. Thus, the distance between the supporting element 16 (or the second face 28) and the flow rate detecting device 14 is small on the upstream or downstream side of the device 14. Consequently, in the flow rate detecting device 14, the fluid to be measured is restrained from intruding to the space provided under the back surface of the device 14 over the area extending in a direction perpendicular to the flow of the to-be-measured fluid (in these figures, the longitudinal direction of the device 14). Hence, the flow 23 of the unstable to-be-measured fluid illustrated in FIG. 27 is eliminated, and the accuracy in detecting a flow rate is enhanced.

Moreover, a part of the flow rate detecting device 14, which contains the fluid temperature detecting element 5, is placed apart from the supporting element 16 (or the third face 29). Thus, the heat resistance between the fluid temperature detecting element 5 and the supporting element 16 is increased. Consequently, the fluid temperature detecting element 5 enhances the follow-up ability with respect to change in fluid temperature.

Furthermore, the fluid temperature detecting diaphragm 30 is formed in the part of the flow rate detecting device 14, in which the fluid temperature detecting element 5 is placed. Thus, the heat resistance between the fluid temperature detecting element 5 and the supporting element 16 is increased still more. Moreover, the heat capacity of the neighboring region of the fluid temperature detecting element 5 is reduced. Consequently, the device 14 obtains extremely accurate follow-up ability with respect to change in temperature of the fluid to be measured. Additionally, the fluid temperature detecting element 5 is thermally insulated from the plate-like substrate 1 by the fluid temperature detecting diaphragm 30. Thus, even when heat is transmitted from the heating element 4 to the platelike substrate 1 and the temperature of this substrate 1 is a little higher than that of the to-be-measured fluid as described above, the provision of this fluid temperature detecting diaphragm 30 in the device 14 enables the fluid temperature detecting element 5 to detect the accurate temperature of the fluid to be measured.

Incidentally, when the fluid to be measured intrudes in the cavity 31 of the fluid temperature detecting diaphragm 30 and an unstable flow occurs in the cavity 31, the flow rate detecting performance of the sensor does not become unstable because the fluid temperature detecting element 5 does not detect a flow rate.

Fourth Embodiment

Figure 12:
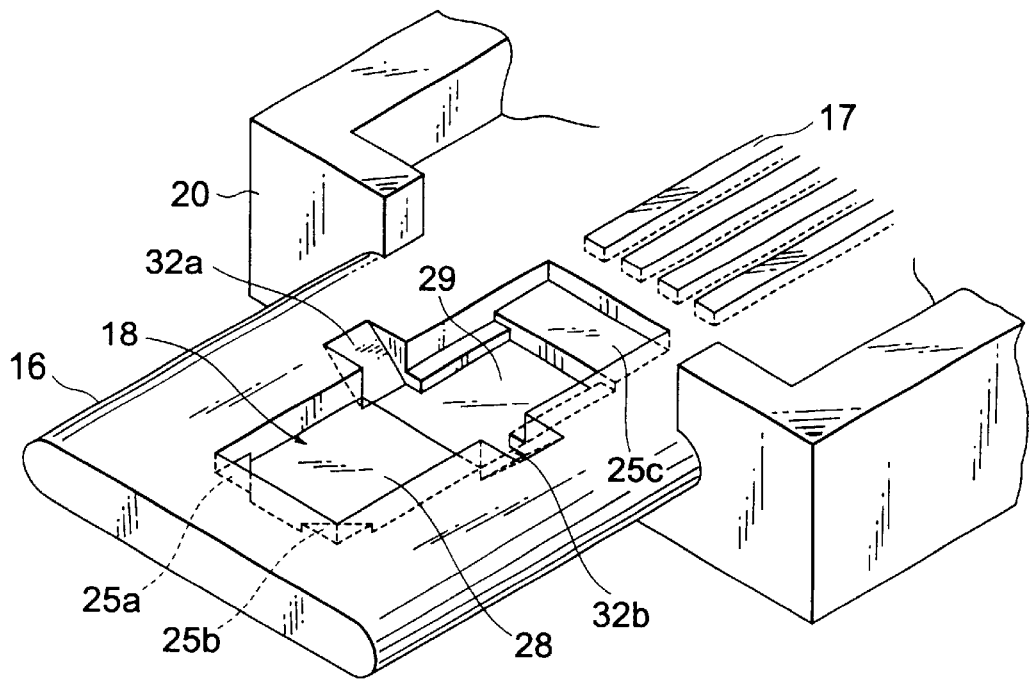
FIG. 12 is an exploded perspective view illustrating a supporting element provided in a flow rate sensor according to a fourth embodiment of the present invention.
Figure 13:
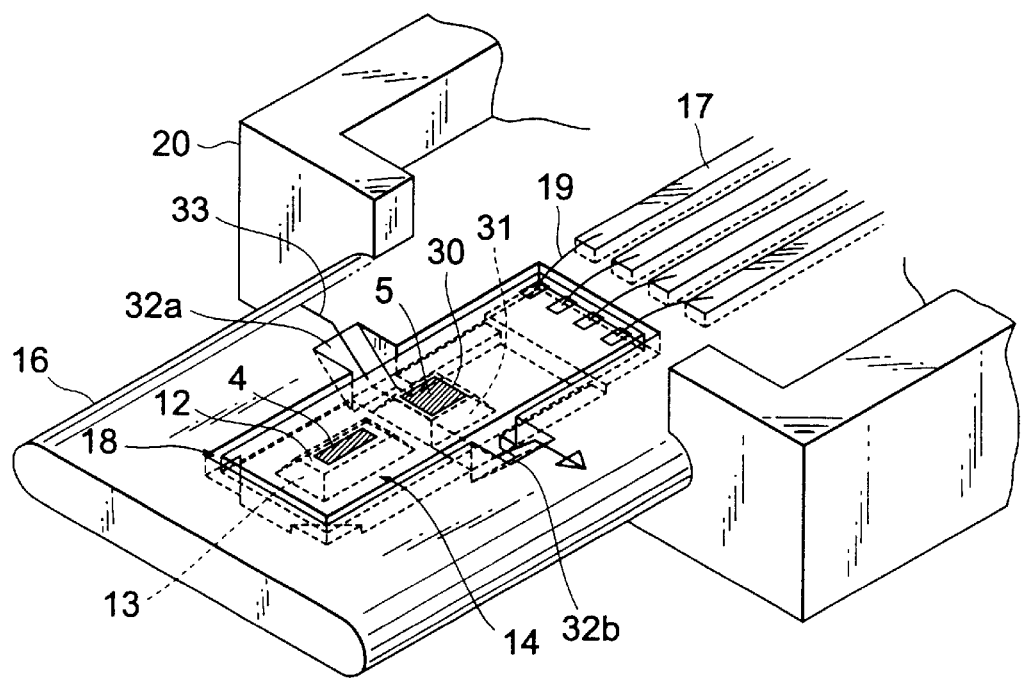
FIG. 13 is a perspective view illustrating a state in which a flow rate detecting device is supported in the flow rate sensor according to the fourth embodiment of the present invention.
Figure 14:
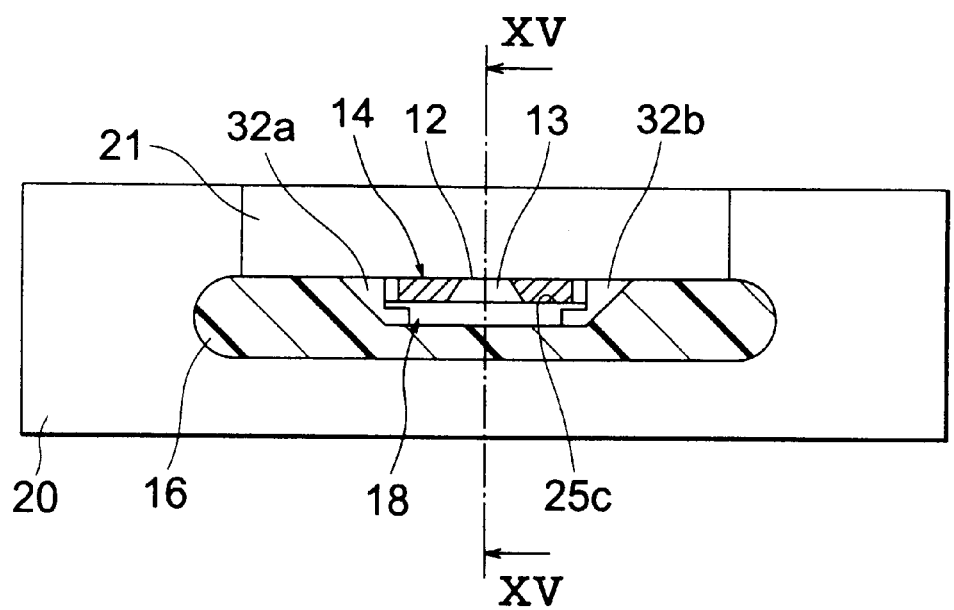
FIG. 14 is a sectional view of a primary portion of the supporting structure for supporting the flow rate detecting device provided in the flow rate sensor according to the fourth embodiment of the present invention.
Figure 15:
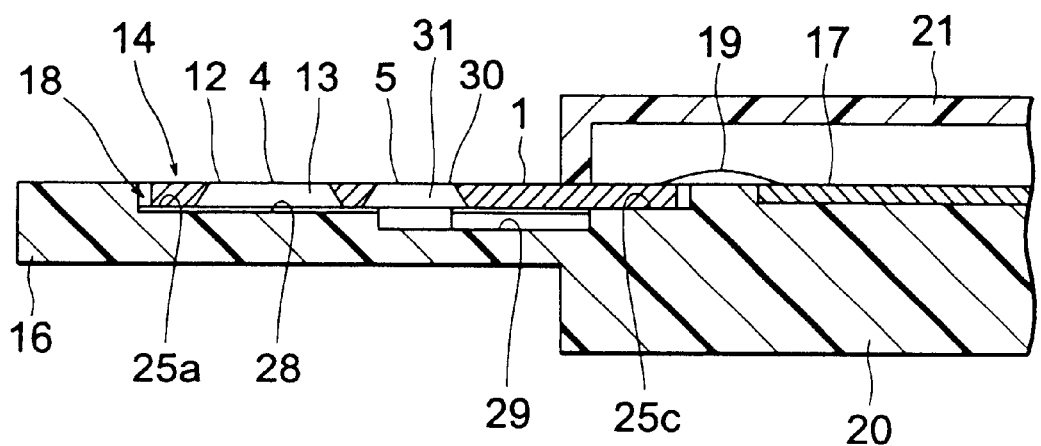
FIG. 15 is a sectional view taken in the direction of arrows on line XI—XI of FIG. 14.

FIG. 12 is an exploded perspective view illustrating a supporting element provided in a flow rate sensor according to the fourth embodiment of the present invention. FIG. 13 is a perspective view illustrating a state in which a flow rate detecting device is supported in the flow rate sensor according to the fourth embodiment of the present invention. FIG. 14 is a sectional view of a primary portion of the supporting structure for supporting the flow rate detecting device provided in the flow rate sensor according to the fourth embodiment of the present invention. FIG. 15 is a sectional view taken in the direction of arrows on line XI—XI of FIG. 14. Incidentally, in FIGS. 12 and 13, the illustration of a cover 21 is omitted.

As illustrated in FIGS. 12 to 15, this fourth embodiment has fluid passage grooves 32a and 32b provided in parts of the upstream and downstream side wall surface portions of a recess portion 18 so that the fluid passage grooves 32a and 32b serve as fluid passages through which the fluid to be measured flows between a lower region of the part in which a fluid temperature detecting element 5 is constructed and the recess portion 18.

Incidentally, the other composing elements of the fourth embodiment are similar to the corresponding elements of the aforementioned third embodiment.

The flow rate sensor configured in this manner has the second face 28 that narrows or throttles a portion into which the fluid to be measured may flow. Thus, no unstable flow is generated in a cavity 13 provided in the back surface portion of the flow rate detecting diaphragm 12. Moreover, in the part in which the fluid temperature detecting element 5 is constructed, the fluid to be measured can be positively introduced not only onto the top surface of the flow rate detecting device 14 but onto the back surface thereof. An arrow 33 indicates the flow of the to-be-measured fluid, which is introduced to the back surface side of the flow rate detecting element 5.

Consequently, even when a change in fluid temperature occurs, the temperature detected by the fluid temperature detecting element 5 immediately follows the fluid temperature. Thus, the flow rate detecting accuracy of the flow rate sensor is enhanced.

Fifth Embodiment

Figure 16:
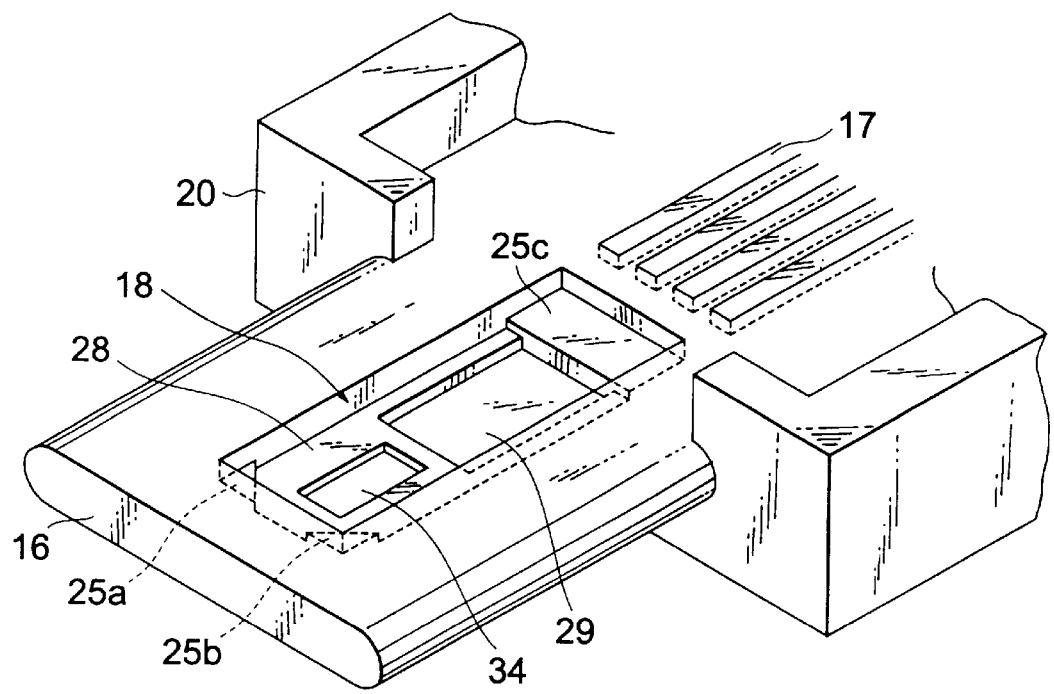
FIG. 16 is an exploded perspective view illustrating a supporting element provided in a flow rate sensor according to a fifth embodiment of the present invention.
Figure 17:
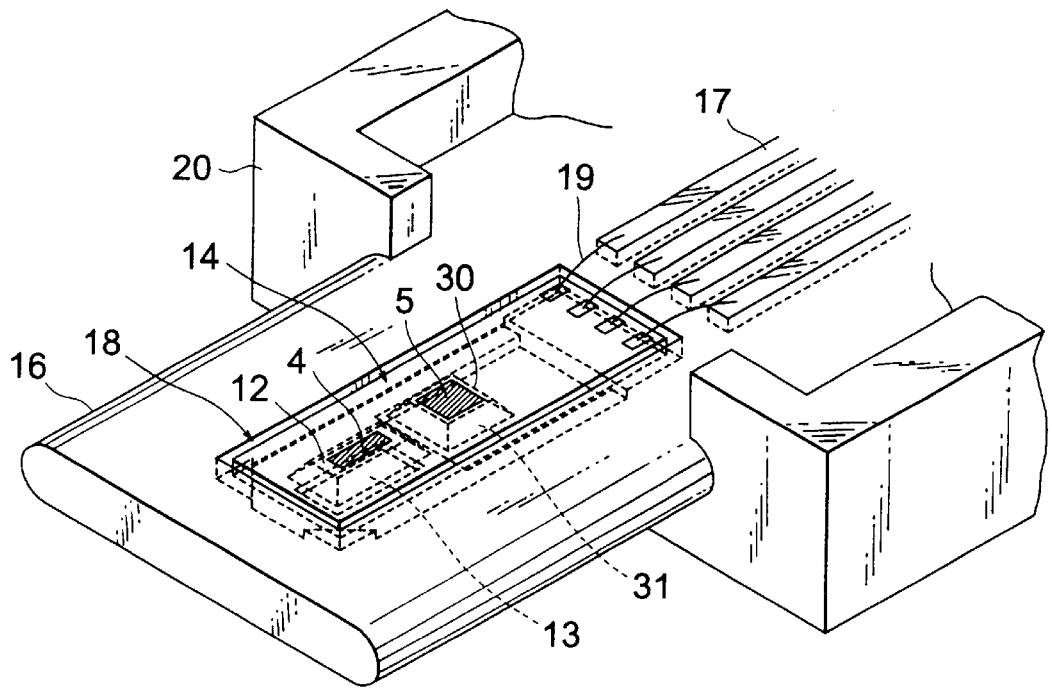
FIG. 17 is a perspective view illustrating a state in which a flow rate detecting device is supported in the flow rate sensor according to the fifth embodiment of the present invention.
Figure 18:
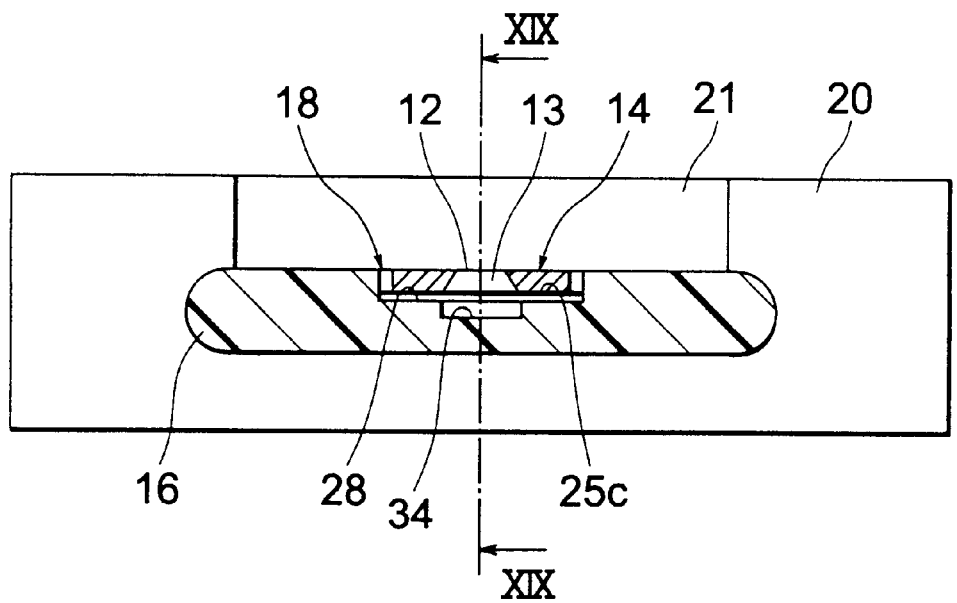
FIG. 18 is a sectional view of a primary portion of the supporting structure for supporting the flow rate detecting device provided in the flow rate sensor according to the fifth embodiment of the present invention.
Figure 19:
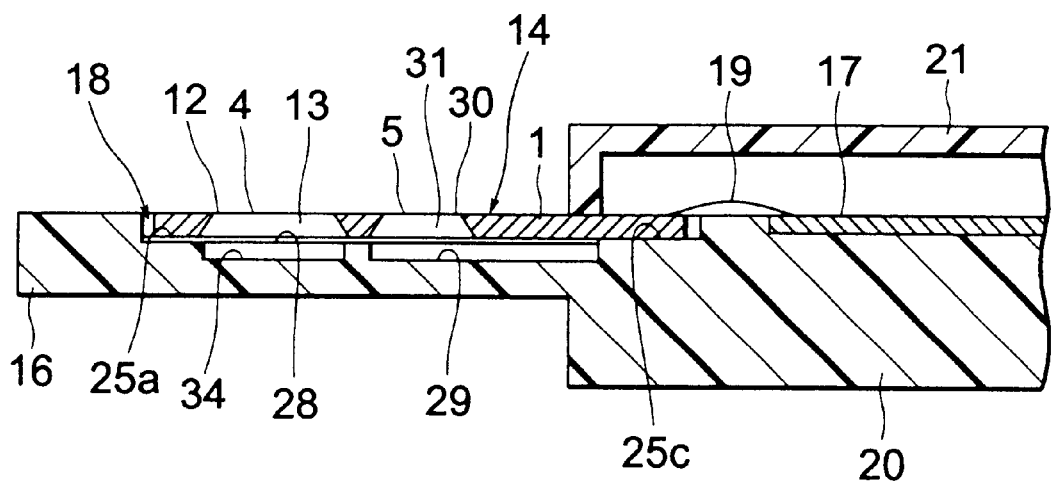
FIG. 19 is a sectional view taken in the direction of arrows on line XIX—XIX of FIG. 18.

FIG. 16 is an exploded perspective view illustrating a supporting element provided in a flow rate sensor according to the fifth embodiment of the present invention. FIG. 17 is a perspective view illustrating a state in which a flow rate detecting device is supported in the flow rate sensor according to the fifth embodiment of the present invention. FIG. 18 is a sectional view of a primary portion of the supporting structure for supporting the flow rate detecting device provided in the flow rate sensor according to the fifth embodiment of the present invention. FIG. 19 is a sectional view taken in the direction of arrows on line XIX—XIX of FIG. 18. Incidentally, in FIGS. 16 and 17, the illustration of a cover 21 is omitted.

As shown in FIGS. 16 to 19, a supporting element 16 is made of resin and shaped like a plate and attached to a base member 20. Further, the recess portion 18, whose perimeter is a little longer than that of a flow rate detecting element 14, is provided in a surface portion of the supporting element 16.

In this recess portion 18, first faces 25a, 25b and 25c, which are spaced from one another and used for supporting the flow rate detecting device 14, are provided. These first faces 25a, 25b and 25c are provided substantially on the same plane. Furthermore, the recess portion 18 has a second face 28 provided at a place that is deeper than the first faces 25a, 25b and 25c. Moreover, the recess portion 18 has a third face 29 and a fourth face 34, which are provided at places being deeper than the second face 28. Further, the third face 29 is formed so that the face 29 faces the cavity 31 of the fluid temperature detecting diaphragm 30 and the peripheral portion of the cavity 31, and that the width thereof in the direction of flow of the to-be-measured fluid is narrower than the width of the flow rate detecting device 14. Moreover, the fourth face 34 faces the cavity 13. Furthermore, the second face 28 is formed on the entire bottom surface of the recess portion 18 except the first faces 25a, 25b and 25c, the third face 29 and the fourth face 34.

Thus, the second face 28 faces the peripheral portion of the cavity 13 of the flow rate detecting diaphragm 12. The third face 29 faces a cavity 31 of the fluid temperature detecting diaphragm 30 and the peripheral portion of the cavity 31. The fourth face 34 faces the cavity 13. Further, in the direction of depth of the recess portion of the supporting element 16, the second face 28 is provided at a place that is deeper than the first faces 25a, 25b and 25c. Moreover, the third face 29 and the fourth face 34 are provided at a place that is deeper than the second face 28.

Incidentally, the remaining composing elements of the fifth embodiment are similar to the aforementioned third embodiment.

In the flow rate sensor constructed in this manner, no fluid to be measured intrudes into the cavity 13 of the flow rate detecting diaphragm 12, because of the fact that the plate-like substrate 1 is placed close to the second face 28. Thus, a flow rate sensor with high accuracy in detecting a flow rate is obtained.

Furthermore, the flow rate detecting diaphragm 12, on which the heating element 4 is placed, is provided apart from a part of, namely, the fourth face 34 of the supporting portion 16. Thus, the heating element 4 provided on the flow rate detecting diaphragm 12 is placed apart from the supporting element 16 facing the heating element 4. Consequently, the heating element 4 is thermally insulated from the supporting element 16. Hence, the flow of heat flowing in the direction of depth of the recess portion from the heating element 4 to the supporting element 16 is reduced. Therefore, the proportion of the heat, which is lost by the movement of the to-be-measured fluid, to Joule heat generated in the heating element 4 is increased. Consequently, the detecting accuracy of the flow rate sensor is enhanced.

Additionally, in the case that the supporting element 16 is made of resin, the supporting element 16 can be provided apart from the heating element 4. This eliminates the necessity for using a high-heat-resistance material. Thus, the flexibility in selecting a resin material is increased. Moreover, similarly, even when the temperature of the heating element 4 is high, the temperature of the supporting element 16 is restrained from rising. Consequently, even when the supporting element 16 is made of resin, a flow rate sensor, which can be used in a high-temperature atmosphere, is obtained.

Furthermore, the third face 29 is provided apart from the back surface of the flow rate detecting device 14. Thus, even when heat is transmitted from the heating element 4 to the plate-like substrate 1, a flow of heat transmitted therefrom to the supporting element 16 is reduced. Consequently, the sensitivity of the flow rate sensor is enhanced.

Sixth Embodiment

Figure 20:
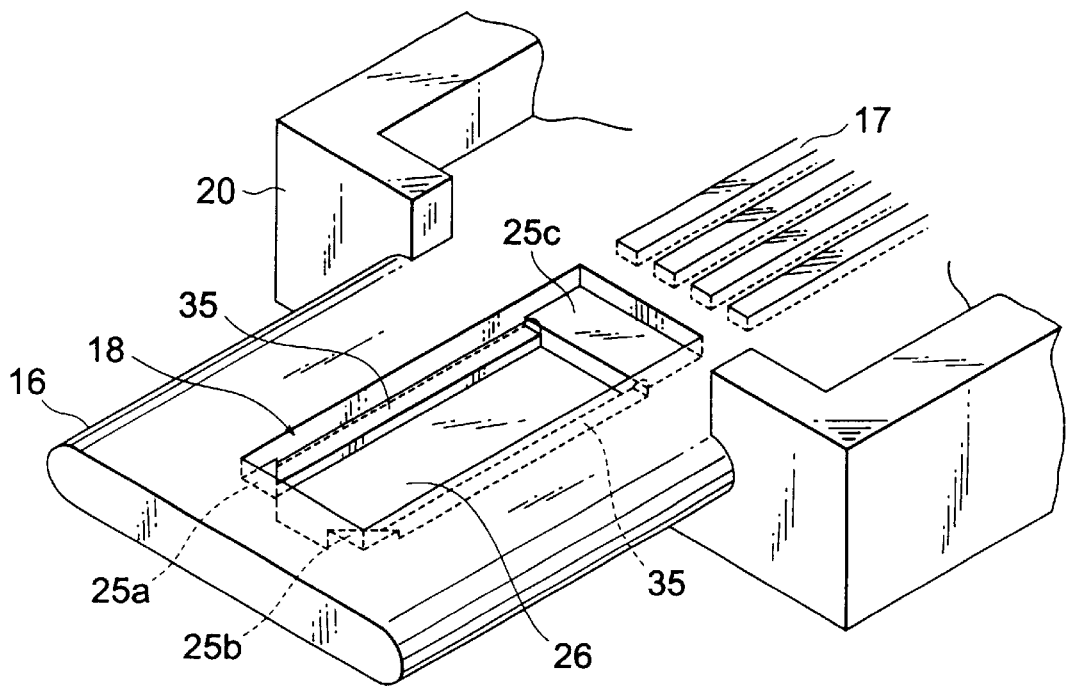
FIG. 20 is an exploded perspective view illustrating a supporting element provided in a flow rate sensor according to a sixth embodiment of the present invention.
Figure 21:
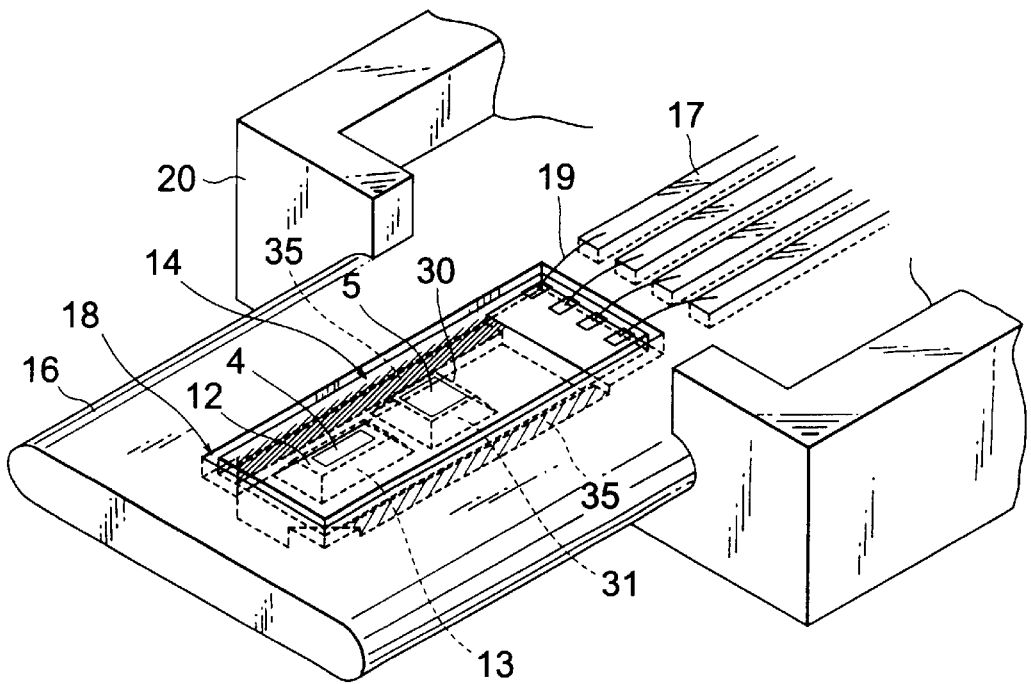
FIG. 21 is a perspective view illustrating a state in which a flow rate detecting device is supported in the flow rate sensor according to the sixth embodiment of the present invention.
Figure 22:
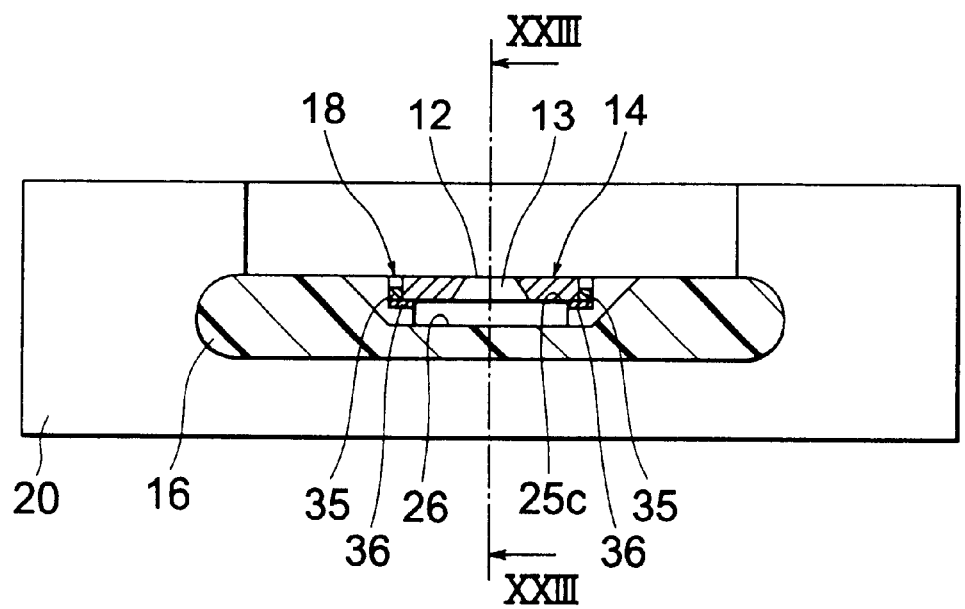
FIG. 22 is a sectional view of a primary portion of the supporting structure for supporting the flow rate detecting device provided in the flow rate sensor according to the sixth embodiment of the present invention.
Figure 23:
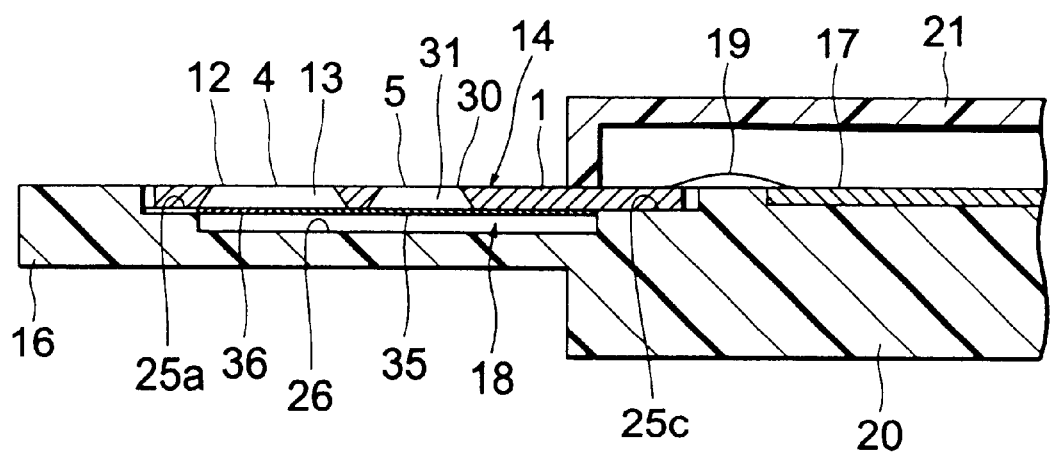
FIG. 23 is a sectional view taken in the direction of arrows on line XXIII—XXIII of FIG. 22.
Figure 24:
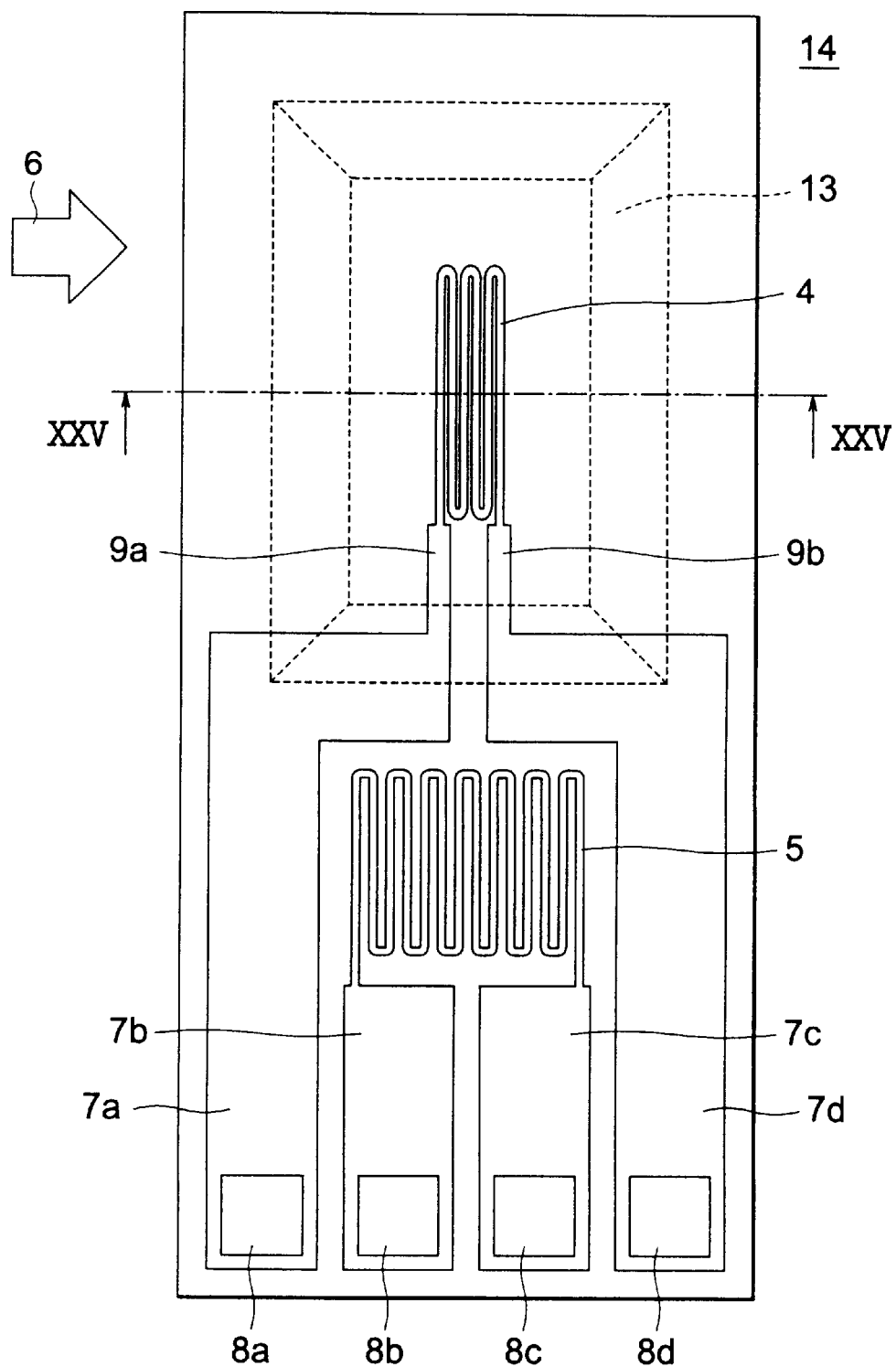
FIG. 24 is a plan view of a flow rate detecting device for use in a conventional flow rate sensor.
Figure 25:
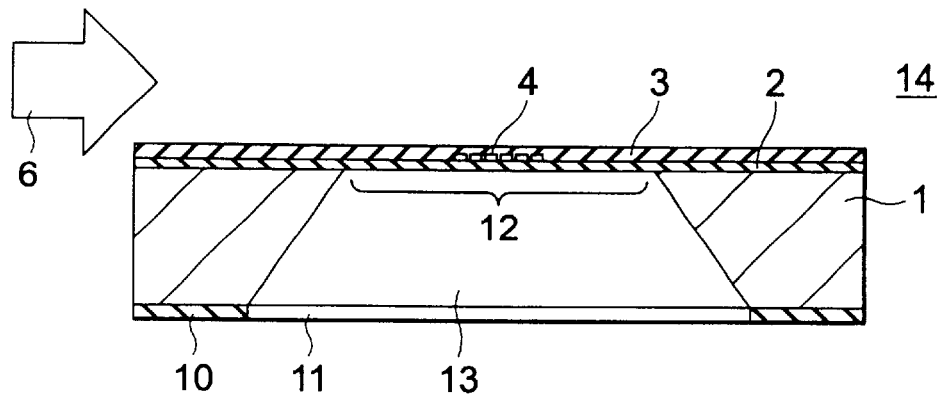
FIG. 25 is a sectional view taken in the direction of arrows on line XXV—XXV of FIG. 24.
Figure 26:
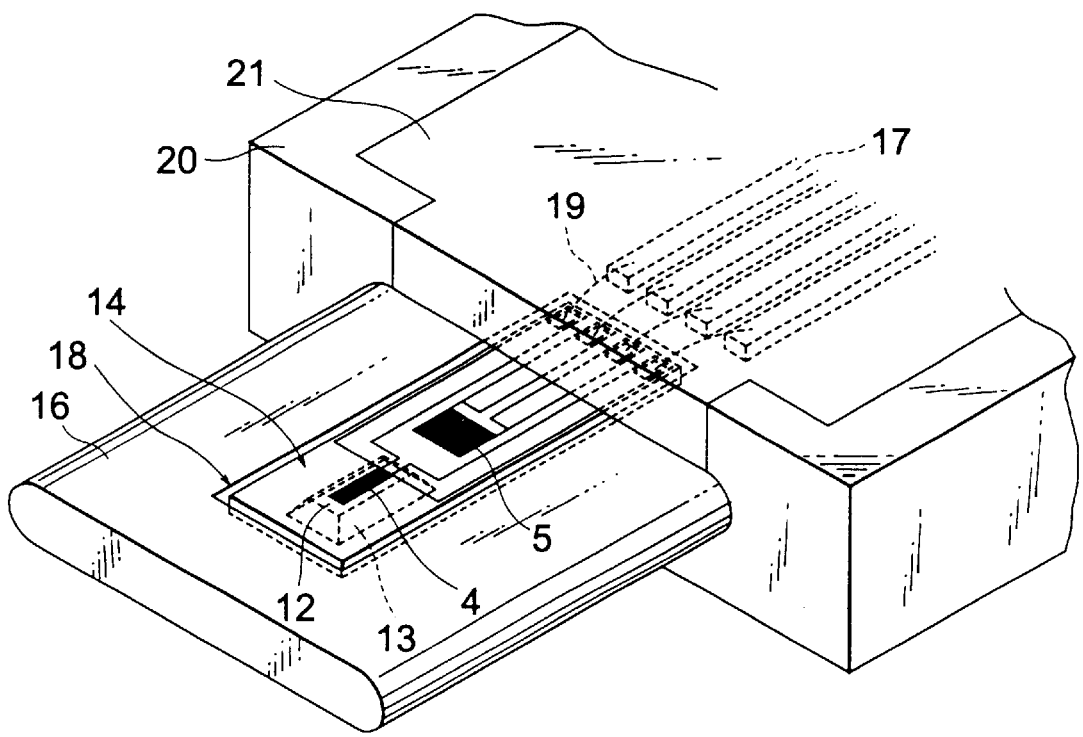
FIG. 26 is a perspective view of a primary part of the conventional flow rate detecting device.

FIG. 20 is an exploded perspective view illustrating a supporting element provided in a flow rate sensor according to the sixth embodiment of the present invention. FIG. 21 is a perspective view illustrating a state in which a flow rate detecting device is supported in the flow rate sensor according to the sixth embodiment of the present invention. FIG. 22 is a sectional view of a primary portion of the supporting structure for supporting the flow rate detecting device provided in the flow rate sensor according to the sixth embodiment of the present invention. FIG. 23 is a sectional view taken in the direction of arrows on line XXIII—XXIII of FIG. 22. Incidentally, in FIGS. 20 and 21, the illustration of a cover 21 is omitted.

As shown in FIGS. 20 to 23, a supporting element 16 is made of resin and shaped like a plate and attached to a base member 20. Further, a recess portion 18, whose perimeter is a little longer than that of a flow rate detecting element 14, is provided in a surface portion of the supporting element 16.

In this recess portion 18, first faces 25*a*, 25*b* and 25*c*, which are spaced from one another and used for supporting the flow rate detecting device 14, are provided. These first faces 25*a*, 25*b* and 25*c* are provided substantially on the same plane. Furthermore, the recess portion 18 has a bottom surface 26 provided at a place that is deeper than the first faces 25*a*, 25*b* and 25*c*. Moreover, the recess portion 18 has fifth faces 36, each which is provided along a side thereof perpendicular to the flow of a to-be-measured fluid at a place that is deeper than the first faces 25*a*, 25*b* and 25*c* and that is shallower than the bottom surface 26. Further, a sealing member 35 constituted by an adhesive is formed on the fifth faces 36 placed at the upstream and downstream sides of the recess portion 18 over the entire region perpendicular to the direction of flow of the fluid to be measured.

Furthermore, the flow rate detecting device 14 is accommodated in the recess portion 18 and fixed to the first face 25*c* by an adhesive. Simultaneously, the upstream and downstream back surfaces of the flow rate detecting device 14 are bonded to the recess portion 18 by the sealing material 35 over the entire region perpendicular to the direction of flow of the to-be-measured fluid. At that time, the top surface of the flow rate detecting device 14 is substantially flush with the top surface of the supporting element 16. Further, a space is present between the bottom surface 26 of the recess portion 18 and the flow rate detecting device 14.

Incidentally, the other composing elements of the sixth embodiment are similar to the corresponding elements of the aforementioned third embodiment.

In the flow rate sensor constructed in this way, the fluid to be measured is restrained from moving from an upstream to a downstream between the flow rate detecting device 14 and the supporting element 16. Thus, a flow rate sensor, which excels in accuracy in measuring a flow rate, is obtained. Sealing member is not formed on at least part of sides, which are parallel to the flow of the to-be-measured fluid, of the recess portion 18 and the flow rate detecting device 14. Therefore, the cavity 13 communicates with the exterior. Consequently, even when a change in pressure of the atmosphere occurs, the diaphragm is neither deformed nor broken.

Further, when the sensor is manufactured, in the case that the sealing material 35 flows into the recess portion 18, the flow of the sealing material 35 is stopped in a large space between the flow rate detecting device 14 and the bottom surface 26. Thus, there is little fear that the sealing material 35 adheres to the neighboring region of the diaphragm 12. Consequently, the detecting capability of the sensor is not impaired.

Incidentally, the aforementioned sealing members 35 are not always provided on the upstream and downstream sides of the device 14. It is sufficient to shut the flow path of the to-be-measured fluid between the flow rate detecting device 14 and the recess portion 18. The sealing member 35 may be formed on one of the upstream and downstream sides of the device 14. Moreover, the sealing member 35 is not necessarily formed over the entire region perpendicular to the direction of flow of the fluid to be measured. The sealing member 35 may be formed on a part of one of the upstream and downstream side regions of the device 14. Namely, it is sufficient that the sealing member 35 is formed in at least a region covering the cavity 13 in a direction perpendicular to the direction of flow of the fluid to be measured.

Additionally, as long as a member made of a material blocks the flow of the fluid to be measured, such a material may be used as the material of the sealing member 35. For example, an epoxy-based adhesive or a siliconebased adhesive may be employed.

Incidentally, in the foregoing description of each of the aforementioned embodiments, there has been described the flow rate sensor which has one heating element 4 formed in the flow rate measuring diaphragm 12 and detects the flow rate of the to-be-described fluid according to a heating current for the heating element 4. However, the present invention may be implemented by flow rate sensors of other types, as long as such flow sensors are adapted to measure a flow rate and a flow velocity according to a phenomenon of heat transmission to a fluid to be measured.

For instance, the present invention may be implemented by a flow rate sensor of the type that has temperature measuring resistor elements placed upstream or downstream from a heating element and that is adapted to detect the difference between temperatures of the temperature measuring resistor elements, and by a flow sensor of the type that uses a plurality of heating elements at upstream and downstream portions and that is adapted to detect the difference among heating currents therefor.

The flow rate sensors of the present invention are configured as described above. Thus, the present invention has the following effects.

According to an aspect of the present invention, there is provided a thermo-sensitive flow rate sensor that comprises: a flow rate detecting device having a plate-like substrate, a heating element made of thermo-sensitive resistor film and formed on a surface of the plate-like substrate, and a cavity formed by removing a part of the plate-like substrate provided under the heating element to constitute a diaphragm for detecting a flow rate; and a supporting element having a recess portion for accommodating the flow rate detecting device formed on a top surface thereof, the supporting element being arranged so that the top surface thereof is in parallel with or at a predetermined angle with respect to a direction of flow of a fluid to be measured. In this thermo-sensitive flow rate sensor, a supporting face for supporting the flow rate detecting device is formed in the recess portion. Further, the flow rate detecting device is accommodated in the recess portion and is supported with and fixed to the supporting face so that the top surface of the flow-rate detecting device is nearly flush with the top surface of the supporting element. Moreover, a thin-plate-like member is attached to a back surface of the plate-like substrate of the flow rate detecting device in such a way as to close the cavity. Thus, the movement of an unstable fluid to be measured does not occur in the cavity for detecting a flow rate. Consequently, a thermo-sensitive flow rate sensor with high accuracy in detecting a flow rate is obtained.

Further, in an embodiment of this thermo-sensitive flow rate sensor, the thin-plate-like member has flexibility. Thus, even when a variation in pressure of the atmosphere occurs, the diaphragm does not break. Consequently, the reliability of the sensor is enhanced.

Moreover, in another embodiment of this thermo-sensitive flow rate sensor, a hole connecting the interior of the cavity to the exterior thereof is formed in the thin-plate-like member. Therefore, when a variation in pressure of the atmosphere occurs, the diaphragm does not break. Consequently, the reliability of the sensor is improved.

Furthermore, in still another embodiment of this thermo-sensitive flow rate sensor, the thin-plate-like member is made of a metallic material. The reliability on heat resistance of this member is increased.

Additionally, in yet another embodiment of this thermo-sensitive flow rate sensor, the thin-plate-like member is made of a glass-based material. Thus, the accuracy in detecting a flow rate and the reliability on heat resistance of this member are enhanced.

Further, in still another embodiment of this thermo-sensitive flow rate sensor, the thin-plate-like member is anodic-bonded to the plate-like substrate. Thus, the reliability on the bonding is enhanced. Consequently, the reliability of the sensor is increased.

Furthermore, in yet another embodiment of this thermo-sensitive flow rate sensor, the thin-plate-like member is made of a polyimide-based material. Thus, the reliability on the heat resistance of this member is enhanced.

Moreover, in still another embodiment of this thermo-sensitive flow rate sensor, the thin-plate-like member is attached to the plate-like substrate by using an epoxy-based adhesive. Therefore, the reliability on the heat resistance of this member is enhanced.

Additionally, in yet another embodiment of this thermo-sensitive flow rate sensor, the thin-plate-like member is attached to the plate-like substrate by using a silicone-based adhesive. Consequently, the reliability on the heat resistance of this member is improved.

Further, according to another aspect of the present invention, there is provided a thermo-sensitive flow rate sensor that comprises: a flow rate detecting device having a plate-like substrate, a heating element made of thermo-sensitive resistor film and formed on a surface of the plate-like substrate, and a cavity formed by removing a part of the plate-like substrate provided under the heating element to constitute a diaphragm for detecting a flow rate; and a supporting element having a recess portion for accommodating the flow rate detecting device formed on a top surface thereof, the supporting element being arranged so that the top surface thereof is in parallel with or at a predetermined angle with respect to a direction of flow of a fluid to be measured. In this thermo-sensitive flow rate sensor, a plurality of first faces for supporting the flow rate detecting device are provided apart from one another in the recess portion, a second face facing a peripheral portion of the cavity and having a width being wider than that of the flow rate detecting device in the direction of flow of fluid to be measured is provided in the recess portion, and a third face, which does not face the cavity, is provided in the recess portion. Further, the second face is provided at a place that is deeper in a direction of depth of the recess portion than the plurality of first faces and the third face is provided at a place that is deeper in the direction of depth of the recess portion than the second face. Moreover, the flow rate detecting device is accommodated in the recess portion, is supported with the plurality of first faces and is fixed to at least one of the first faces so that the top surface of the flow rate detecting device is nearly flush with the top surface of the supporting element. Thus, a thermo-sensitive flow rate sensor with high accuracy in detecting a flow rate and with high sensitivity is obtained.

Further, in an embodiment of this thermo-sensitive flow rate sensor, a width of the third face in the direction of flow of the fluid to be measured is narrower than that of the flow rate detecting device in the direction of flow of the fluid to be measured. Thus, the effect of preventing the to-be-measured fluid from intruding into a space between the flow rate detecting device and the recess portion of the supporting element is enhanced. Consequently, the accuracy of measurement is improved.

Moreover, in another embodiment of this thermo-sensitive flow rate sensor, a fluid temperature detecting element is formed on the top surface of the plate-like substrate in such a way as to be apart from a region, in which the flow rate detecting diaphragm is formed, and to face the third face. Thus, even when the temperature of the fluid to be measured is changed, the flow rate thereof is detected with high accuracy.

Furthermore, in still another embodiment of this thermo-sensitive flow rate sensor, the fluid temperature detecting diaphragm is constituted by removing at least a part of the plate-like substrate provided under the fluid temperature detecting element. Therefore, even when the temperature of the to-be-measured fluid varies, the flow rate thereof is detected with high accuracy.

Additionally, in yet another embodiment of this thermo-sensitive flow rate sensor, fluid passage grooves are provided by cutting both of upstream and downstream side surfaces of the recess portion of the supporting element in such a way as to reach the third face. Further, a fluid passage, through which the fluid to be measured flows, is constituted between a back surface of a region in which the fluid temperature detecting element of the flow rate detecting device is formed and the recess portion. Consequently, even when the temperature of the to-be-measured fluid changes, the flow rate thereof is detected with high accuracy.

Moreover, according to still another aspect of the present invention, there is provided a thermo-sensitive flow rate sensor that comprises: a flow rate detecting device having a plate-like substrate, a heating element made of thermo-sensitive resistor film and formed on a surface of the plate-like substrate, and a cavity formed by removing a part of the plate-like substrate provided under the heating element to constitute a diaphragm for detecting a flow rate; and a supporting element having a recess portion for accommodating the flow rate detecting device formed on a top surface thereof, the supporting element being arranged so that the top surface thereof is in parallel with or at a predetermined angle with respect to a direction of flow of a fluid to be measured. In this thermo-sensitive flow rate sensor, a plurality of first faces for supporting the flow rate detecting device are provided apart from one another in the recess portion, a second face facing a peripheral portion of the cavity and having a width being wider than that of the flow rate detecting device in the direction of flow of fluid to be measured is provided in the recess portion, and a fourth face facing at least a part of the cavity is provided in the recess portion. Further, the second face is provided at a place that is deeper in a direction of depth of the recess portion than the plurality of first faces and the fourth face is provided at a place that is deeper in the direction of depth of the recess portion than the second face. Moreover, the flow rate detecting device is accommodated in the recess portion, is supported with the plurality of first faces and is fixed to at least one of the first faces so that the top surface of the flow rate detecting device is nearly flush with the top surface of the supporting element. Thus, a thermosensitive flow rate sensor with high sensitivity in detecting a flow rate is obtained.

Further, in an embodiment of this thermo-sensitive flow rate sensor, a third face is provided in the recess portion of the supporting element so as not to face at least the cavity of the flow rate detecting diaphragm. Furthermore, the third face is provided at a place that is deeper in the direction of depth of the recess portion than the second face. Thus, the flow rate detecting sensitivity of the sensor is enhanced.

Moreover, in another embodiment of this thermo-sensitive flow rate sensor, a width of the third face in the direction of flow of the fluid to be measured is narrower than that of the flow rate detecting device in the direction of flow of the fluid to be measured. Thus, the accuracy of measurement is enhanced.

Furthermore, according to yet another aspect of the present invention, there is provided a thermo-sensitive flow rate sensor that comprises: a flow rate detecting device having a plate-like substrate, a heating element made of thermo-sensitive resistor film and formed on a surface of the the plate-like substrate, and a cavity formed by removing a part of the plate-like substrate provided under the heating element to constitute a diaphragm for detecting a flow rate; and a supporting element having a recess portion for accommodating the flow rate detecting device formed on a top surface thereof, the supporting element being arranged so that the top surface thereof is in parallel with or at a predetermined angle with respect to a direction of flow of a fluid to be measured. In this thermo-sensitive flow rate sensor, the flow rate detecting device is accommodated in the recess portion so that the top surface of the flow rate detecting device is nearly flush with the top surface of the supporting element. Moreover, a sealing member is formed in such a way as not to be present between the recess portion and at least a part of an end portion, which is nearly parallel to the direction of flow of the fluid to be measured, of the flow rate detecting element and in such a manner as to fill at least a part of a gap between the recess portion and each of upstream and downstream end portions, which are placed in the direction of flow of the fluid to be measured, of the flow rate detecting device. Thus, a thermo-sensitive flow rate sensor with high accuracy in detecting a flow rate is obtained.

Further, in an embodiment of this thermo-sensitive flow rate sensor, the recess portion of the supporting element has a first face for supporting the flow rate detecting device, a bottom surface, and a fifth face provided along a part of sides that are not parallel with the flow of the fluid to be measured. Moreover, the fifth face is provided at a place that is deeper than the first face and that is shallower than the bottom surface, and wherein the sealing member is formed on the fifth face.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A thermo-sensitive flow rate sensor comprising:
    a flow rate detecting device having:
        a substantially planar substrate,
        a heating element made of thermo-sensitive resistor film and formed on a surface of said substantially planar substrate, and
        a cavity formed within said substrate by removing a part of said substantially planar substrate provided under said heating element to constitute a diaphragm for detecting a flow rate;
    a thin substantially planar member, attached to a back surface of said substantially planar substrate of said flow rate detecting device, to close said cavity; and
    a supporting element having a recess portion holding said flow rate detecting device on a top surface thereof said supporting element being arranged so that the top surface thereof is parallel with a direction of flow of a fluid to be measured,
    wherein said recess portion has a supporting face therein for supporting said flow rate detecting device,
    wherein said flow rate detecting device is accommodated in said recess portion and is supported with and fixed to said supporting face so that the top surface of said flow-rate detecting device is nearly flush with the top surface of said supporting element.

2. The thermo-sensitive flow rate sensor according to claim 1, wherein said thin substantially planar member has flexibility .

3. The thermo-sensitive flow rate sensor according to claim 1, wherein said thin substantially planar member has a hole formed therein connecting the interior of said cavity to the exterior thereof.

4. The thermo-sensitive flow rate sensor according to claim 1, wherein said thin substantially planar member is mad e of a metallic material.

5. The thermo-sensitive flow rate sensor according to claim 1, wherein said thin substantially planar member is made of a glass-based material.

6. The thermo-sensitive flow rate sensor according to claim 5, wherein said thin substantially planar member is anodic-bonded to said plate-like substrate.

7. The thermo-sensitive flow rate sensor according to claim 1, wherein said thin substantially planar member is made of a polyimide-based material .

8. The thermo-sensitive flow rate sensor according to claim 1, wherein said thin substantially planar member is attached to said substrate by using an epoxy-based adhesive.

9. The thermo-sensitive flow rate sensor according to claim 1, wherein said thin substantially planar member is attached to said substrate by using a silicone-based adhesive.

10. A thermo-sensitive flow rate sensor comprising:
a flow rate detecting device having:
a substantially planar substrate,
a heating element made of thermo-sensitive resistor film and formed on a surface of said substantially planar substrate, and
a cavity formed by removing a part of said substantially planar substrate provided under said heating element to constitute a diaphragm for detecting a flow rate; and
a supporting element having a recess portion holding said flow rate detecting device formed on a top surface thereof, said supporting element being arranged so that the top surface thereof is in parallel with a direction of flow of a fluid to be measured,
wherein a plurality of first faces for supporting said flow rate detecting device are provided apart from one another in said recess portion, a second face facing a peripheral portion of said cavity and having a width being wider than that of said flow rate detecting device in the direction of flow of fluid to be measured is provided in said recess portion, and a third face, which does not face said cavity, is provided in said recess portion,
wherein said second face is provided at a place that is deeper in a direction of depth of said recess portion than said plurality of first faces and said third face is provided at a place that is deeper in the direction of depth of said recess portion than said second face, and
wherein said flow rate detecting device is accommodated in said recess portion, is supported with said plurality of first faces and is fixed to at least one of said first faces so that the top surface of said flow rate detecting device is nearly flush with the top surface of said supporting element.

11. The thermo-sensitive flow rate sensor according to claim 10, wherein a width of said third face in the direction of flow of said fluid to be measured is narrower than that of said flow rate detecting device in the direction of flow of said fluid to be measured.

12. The thermo-sensitive flow rate sensor according to claim 10, further comprising a fluid temperature detecting element formed on the top surface of said substantially planar substrate, said fluid temperature detecting element being apart from a region, in which said flow rate detecting diaphragm is formed, and facing said third face.

13. The thermo-sensitive flow rate sensor according to claim 12, wherein a fluid temperature detecting diaphragm is constituted by removing at least a part of said substantially planar substrate provided under said fluid temperature detecting element.

14. The thermo-sensitive flow rate sensor according to claim 12, further comprising fluid passage grooves provided by cutting both of upstream and downstream side surfaces of said recess portion in such a way as to reach said third face, whereby a fluid passage, through which the fluid to be measured flows, is constituted between a back surface of a region in which said fluid temperature detecting element is formed and said recess portion.

15. A thermo-sensitive flow rate sensor comprising:
a flow rate detecting device having:
a substantially planar substrate,
a heating element made of thermo-sensitive resistor film and formed on a surface of said substantially planar substrate, and
a cavity formed by removing a part of said substantially planar substrate provided under said heating element to constitute a diaphragm for detecting a flow rate; and
a supporting element having a recess portion holding said flow rate detecting device formed on a top surface thereof, said supporting element being arranged so that the top surface thereof is in parallel with a direction of flow of a fluid to be measured,
wherein a plurality of first faces for supporting said flow rate detecting device are provided apart from one another in said recess portion, a second face facing a peripheral portion of said cavity and having a width being wider than that of said flow rate detecting device in the direction of flow of fluid to be measured is provided in said recess portion, and a fourth face facing at least a part of said cavity is provided in said recess portion,
wherein said second face is provided at a place that is deeper in a direction of depth of said recess portion than said plurality of first faces and said fourth face is provided at a place that is deeper in the direction of depth of said recess portion than said second face, and
wherein said flow rate detecting device is accommodated in said recess portion, is supported with said plurality of first faces and is fixed to at least one of said first faces so that the top surface of said flow rate detecting device is nearly flush with the top surface of said supporting element.

16. The thermo-sensitive flow rate sensor according to claim 15, further comprising a third face provided in said recess portion so as not to face at least said cavity, said third face being provided at a place that is deeper in the direction of depth of said recess portion than said second face.

17. The thermo-sensitive flow rate sensor according to claim 16, wherein a width of said third face in the direction of flow of said fluid to be measured is narrower than that of said flow rate detecting device in the direction of flow of said fluid to be measured.

18. A thermo-sensitive flow rate sensor composing:
a flow rate detecting device having:
a substantially planar substrate,
a heating element made of thermo-sensitive resistor film and formed on a surface of said substantially planar substrate, and
a cavity formed within said substrate by removing a part of said substantially planar substrate provided under said heating element to constitute a diaphragm for detecting a flow rate;
a thin substantially planar member, attached to a back surface of said substantially planar substrate of said flow rate detecting device, to close said cavity; and
a supporting element having a recess portion holding said flow rate detecting device on a top surface thereof, said supporting element being arranged so that the top surface thereof is at a predetermined angle with respect to a direction of flow of a fluid to be measured,
wherein said recess portion has a supporting face therein for supporting said flow rate detecting device,
wherein said flow rate detecting device is accommodated in said recess portion and is supported with and fixed to said supporting face so that the top surface of said flow-rate detecting device is nearly flush with the top surface of said supporting element.

19. The thermo-sensitive flow rate sensor according to claim 18, wherein said thin substantially planar member has flexibility.

20. The thermo-sensitive flow rate sensor according to claim 18, wherein said thin substantially planar member has a hole formed therein connecting the interior of said cavity to the exterior thereof.

21. The thermo-sensitive flow rate sensor according to claim 18, wherein said thin substantially planar member is made of a metallic material.

22. The thermo-sensitive flow rate sensor according to claim 18, wherein said thin substantially planar member is made of a glass-based material.

23. The thermo-sensitive flow rate sensor according to claim 22, wherein said thin substantially planar member is anodic-bonded to said plate-like substrate.

24. The thermo-sensitive flow rate sensor according to claim 18, wherein said thin substantially planar member is made of a polyimide-based material.

25. The thermo-sensitive flow rate sensor according to claim 18, wherein said thin substantially planar member is attached to said substrate by using an epoxy-based adhesive.

26. The thermo-sensitive flow rate sensor according to claim 18, wherein said thin substantially planar member is attached to said substrate by using a silicone-based adhesive.

27. A thermo-sensitive flow rate sensor comprising:
a flow rate detecting device having:
a substantially planar substrate,
a heating element made of thermo-sensitive resistor film and formed on a surface of said substantially planar substrate, and
a cavity formed by removing a part of said substantially planar substrate provided under said heating element to constitute a diaphragm for detecting a flow rate; and
a supporting element having a recess portion holding said flow rate detecting device formed on a top surface thereof, said supporting element being arranged so that the top surface thereof is at a predetermined angle with respect to a direction of flow of a fluid to be measured,
wherein a plurality of first faces for supporting said flow rate detecting device are provided apart from one another in said recess portion, a second face facing a peripheral portion of said cavity and having a width being wider than that of said flow rate detecting device in the direction of flow of fluid to be measured is provided in said recess portion, and a third face, which does not face said cavity, is provided in said recess portion,
wherein said second face is provided at a place that is deeper in a direction of depth of said recess portion than said plurality of first faces and said third face is provided at a place that is deeper in the direction of depth of said recess portion than said second face, and
wherein said flow rate detecting device is accommodated in said recess portion, is supported with said plurality of first faces and is fixed to at least one of said first faces so that the top surface of said flow rate detecting device is nearly flush with the top surface of said supporting element.

28. The thermo-sensitive flow rate sensor according to claim 27, wherein a width of said third face in the direction of flow of said fluid to be measured is narrower than that of said flow rate detecting device in the direction of flow of said fluid to be measured.

29. The thermo-sensitive flow rate sensor according to claim 27, further comprising a fluid temperature detecting element formed on the top surface of said substantially planar substrate, said fluid temperature detecting element being apart from a region, in which said flow rate detecting diaphragm is formed, and facing said third face.

30. The thermo-sensitive flow rate sensor according to claim 29, wherein a fluid temperature detecting diaphragm is constituted by removing at least a part of said substantially planar substrate provided under said fluid temperature detecting element.

31. The thermo-sensitive flow rate sensor according to claim 29, further comprising fluid passage grooves provided by cutting both of upstream and downstream side surfaces of said recess portion in such a way as to reach said third face, whereby a fluid passage, through which the fluid to be measured flows, is constituted between a back surface of a region in which said fluid temperature detecting element is formed and said recess portion.

32. A thermo-sensitive flow rate sensor comprising:
a flow rate detecting device having:
a substantially planar substrate,
a heating element made of thermo-sensitive resistor film and formed on a surface of said substantially planar substrate, and
a cavity formed by removing a part of said substantially planar substrate provided under said heating element to constitute a diaphragm for detecting a flow rate; and
a supporting element having a recess portion holding said flow rate detecting device formed on a top surface thereof, said supporting element being arranged so that the top surface thereof is at a predetermined angle with respect to a direction of flow of a fluid to be measured,
wherein a plurality of first faces for supporting said flow rate detecting device are provided apart from one another in said recess portion, a second face facing a peripheral portion of said cavity and having a width being wider than that of said flow rate detecting device in the direction of flow of fluid to be measured is provided in said recess portion, and a fourth face facing at least a part of said cavity is provided in said recess portion,
wherein said second face is provided at a place that is deeper in a direction of depth of said recess portion than said plurality of first faces and said fourth face is provided at a place that is deeper in the direction of depth of said recess portion than said second face, and
wherein said flow rate detecting device is accommodated in said recess portion, is supported with said plurality of first faces and is fixed to at least one of said first faces so that the top surface of said flow rate detecting device is nearly flush with the top surface of said supporting element.

33. The thermo-sensitive flow rate sensor according to claim 32, further comprising a third face provided in said recess portion so as not to face at least said cavity, said third face being provided at a place that is deeper in the direction of depth of said recess portion than said second face.

34. The thermo-sensitive flow rate sensor according to claim 32, wherein a width of said third face in the direction of flow of said fluid to be measured is narrower than that of said flow rate detecting device in the direction of flow of said fluid to be measured.

* * * * *